United States Patent
Höchsmann et al.

(10) Patent No.: US 10,717,262 B2
(45) Date of Patent: Jul. 21, 2020

(54) METHOD AND DEVICE FOR UNPACKING A GENERATIVE MANUFACTURED COMPONENT

(71) Applicant: ExOne GmbH, Gersthofen (DE)

(72) Inventors: Rainer Höchsmann, Langenneufnach (DE); Alexander Müller, Diedorf-Vogelsang (DE); Sven Klaua, Augsburg (DE); Maximilian Baumann, Augsburg (DE); Wolfgang Seeger, Augsburg (DE); Renate Ratzenberger, Jettingen-Scheppach (DE); Lisa Huber, Friedberg (DE)

(73) Assignee: ExOne GmbH, Gersthofen (DE)

( * ) Notice: Subject to any disclaimer, the term of this patent is extended or adjusted under 35 U.S.C. 154(b) by 136 days.

(21) Appl. No.: 15/507,002

(22) PCT Filed: Aug. 28, 2015

(86) PCT No.: PCT/EP2015/069796
§ 371 (c)(1),
(2) Date: Feb. 27, 2017

(87) PCT Pub. No.: WO2016/030530
PCT Pub. Date: Mar. 3, 2016

(65) Prior Publication Data
US 2017/0246808 A1 Aug. 31, 2017

(30) Foreign Application Priority Data
Aug. 29, 2014 (DE) ......................... 10 2014 112 446

(51) Int. Cl.
*B33Y 10/00* (2015.01)
*B33Y 30/00* (2015.01)
(Continued)

(52) U.S. Cl.
CPC ............ *B33Y 10/00* (2014.12); *B29C 64/153* (2017.08); *B29C 64/165* (2017.08); *B29C 64/20* (2017.08);
(Continued)

(58) Field of Classification Search
CPC .......... B33Y 10/00; B33Y 40/00; B33Y 30/00
See application file for complete search history.

(56) References Cited

U.S. PATENT DOCUMENTS

| | | | | |
|---|---|---|---|---|
| 5,423,370 A | * | 6/1995 | Bonnemasou | B22D 29/003 164/132 |
| 6,554,600 B1 | * | 4/2003 | Hofmann | B29C 41/34 425/174.4 |
| 2015/0258744 A1 | * | 9/2015 | Muller | B08B 7/028 264/37.29 |

FOREIGN PATENT DOCUMENTS

| | | | | |
|---|---|---|---|---|
| JP | 2014-104683 A | | 6/2014 | |
| WO | WO-2014009376 A1 | * | 1/2014 | ............. B33Y 10/00 |

OTHER PUBLICATIONS

Fujiwara et al., JP2014-104683, Google Translation retrieved on Jul. 19, 2019, pp. 1-8 (Year: 2014).*

* cited by examiner

*Primary Examiner* — Francisco W Tschen
(74) *Attorney, Agent, or Firm* — Philip D Lane

(57) ABSTRACT

Disclosed is a method for unpacking a component 16 manufactured by means of a generative manufacturing process, from a particulate material fill 18. In the method, an auxiliary frame 20 having a vertical circumferential wall structure 22, open downward, is arranged above a vertical circumferential wall structure 12 of a construction box 10. In addition, a construction platform 14 of the construction box 10 is displaced upward, so that the particulate material fill 18 containing the component 16 is transferred from the con- (Continued)

struction box 10 to the auxiliary frame 20. In addition, the auxiliary frame 20 with the particulate material fill 18 containing the component, and the construction box 10 are moved away from each other, and the component 16 is unpacked from the particulate material fill 18 at least in part and is removed from the auxiliary frame 20.

3 Claims, 28 Drawing Sheets

(51) Int. Cl.
*B33Y 40/00* (2015.01)
*B29C 64/20* (2017.01)
*B29C 64/40* (2017.01)
*B66F 19/00* (2006.01)
*B65G 65/30* (2006.01)
*B29C 64/153* (2017.01)
*B29C 64/165* (2017.01)
*B29C 64/35* (2017.01)

(52) U.S. Cl.
CPC .............. *B29C 64/35* (2017.08); *B29C 64/40* (2017.08); *B33Y 30/00* (2014.12); *B33Y 40/00* (2014.12); *B65G 65/30* (2013.01); *B66F 19/00* (2013.01)

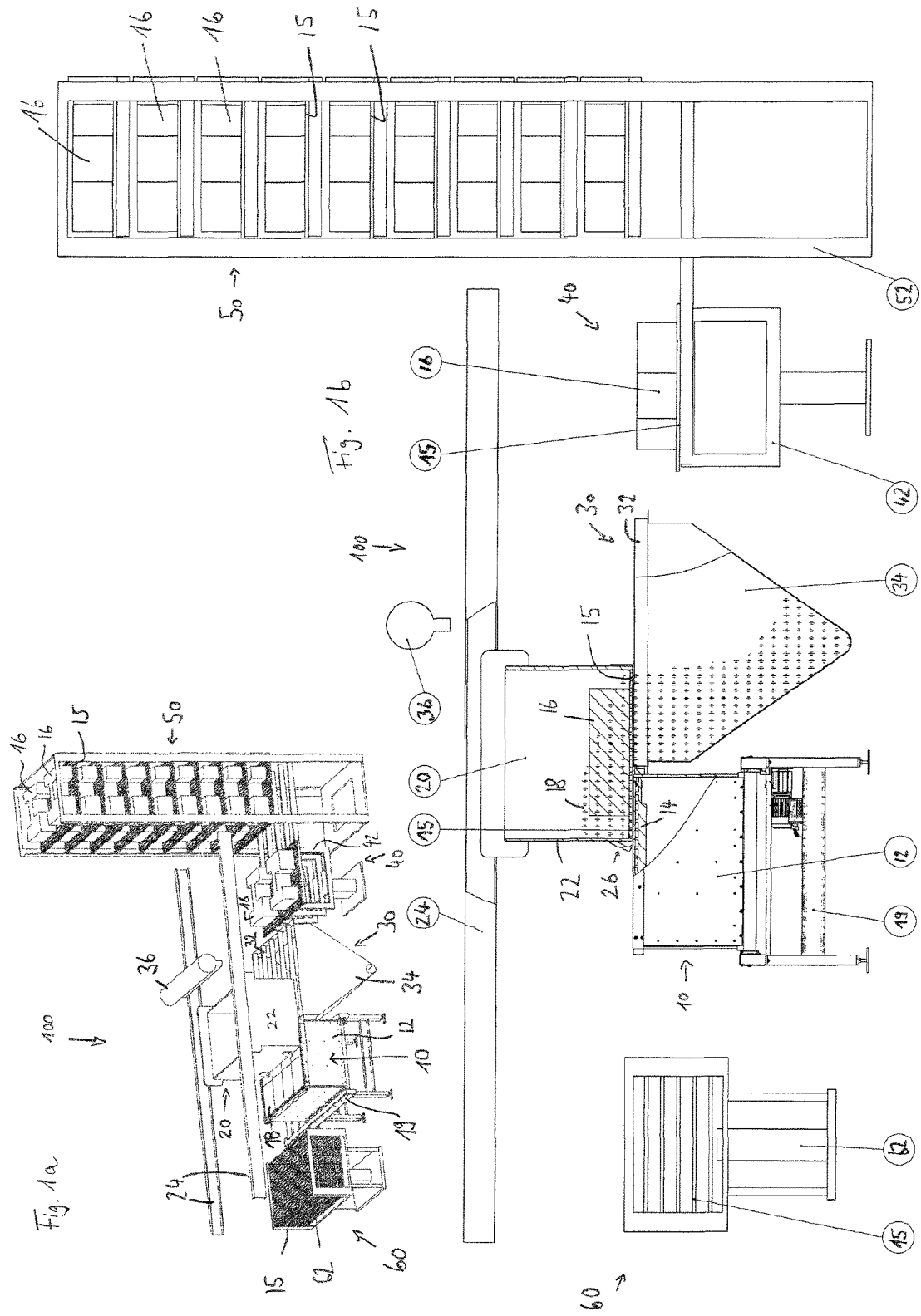

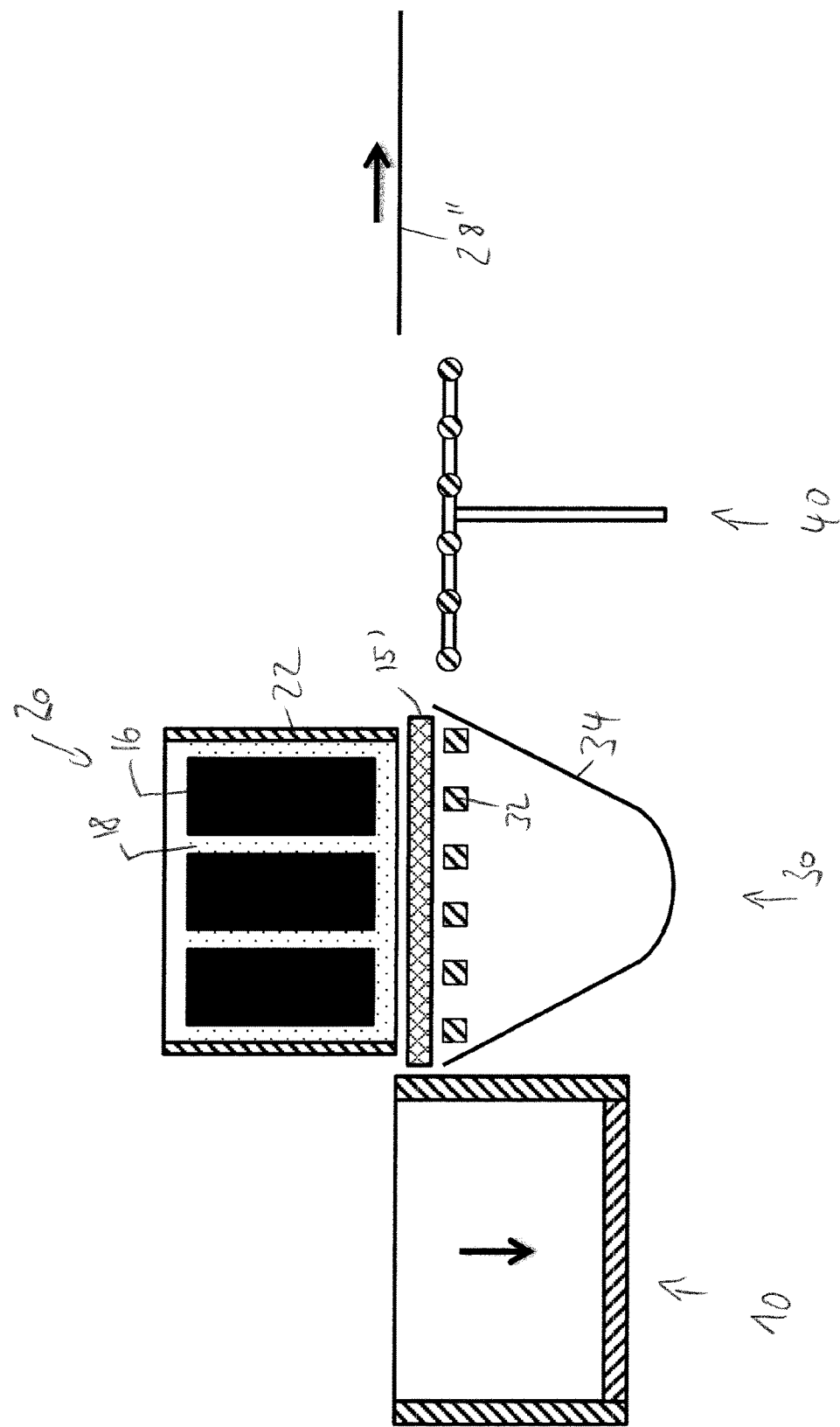

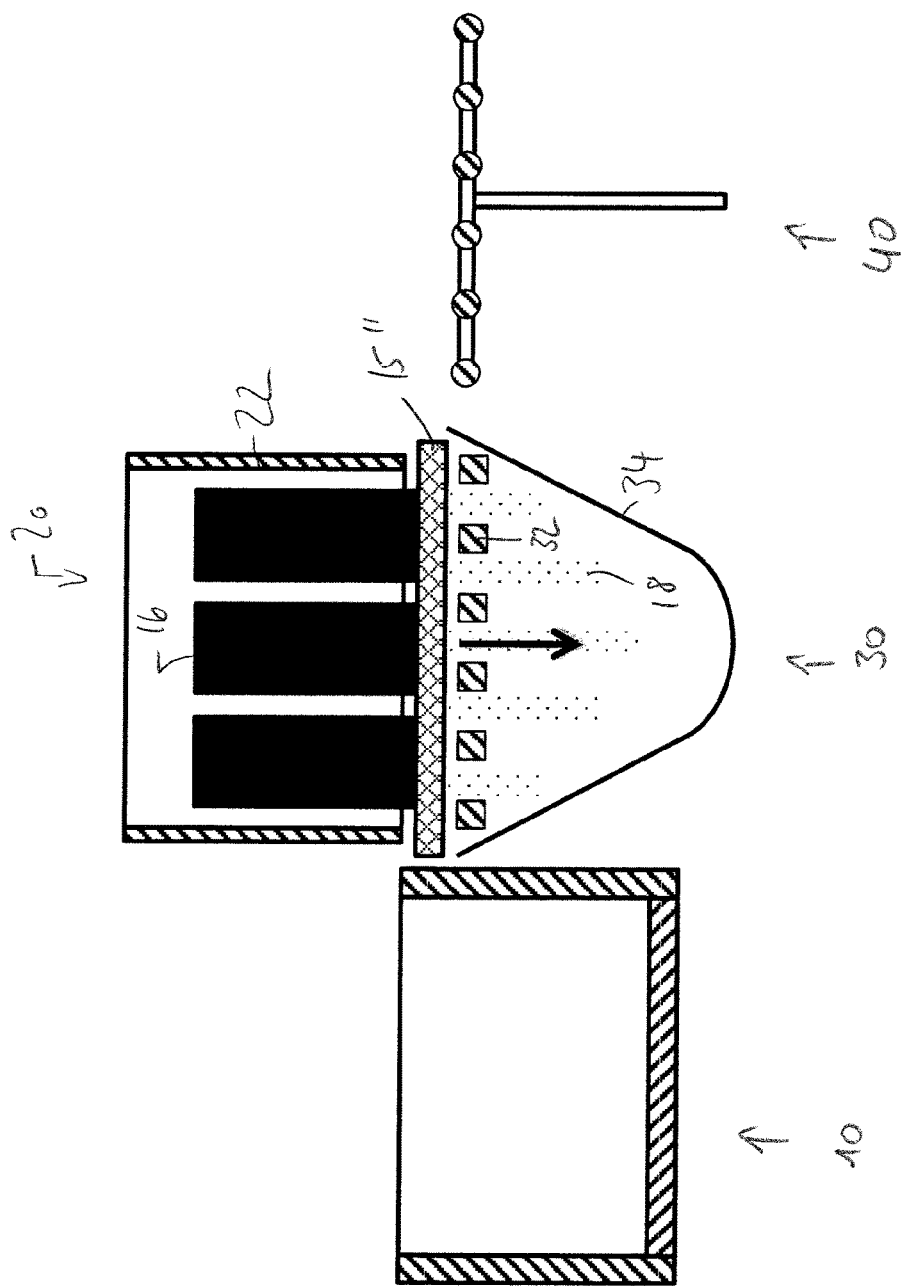

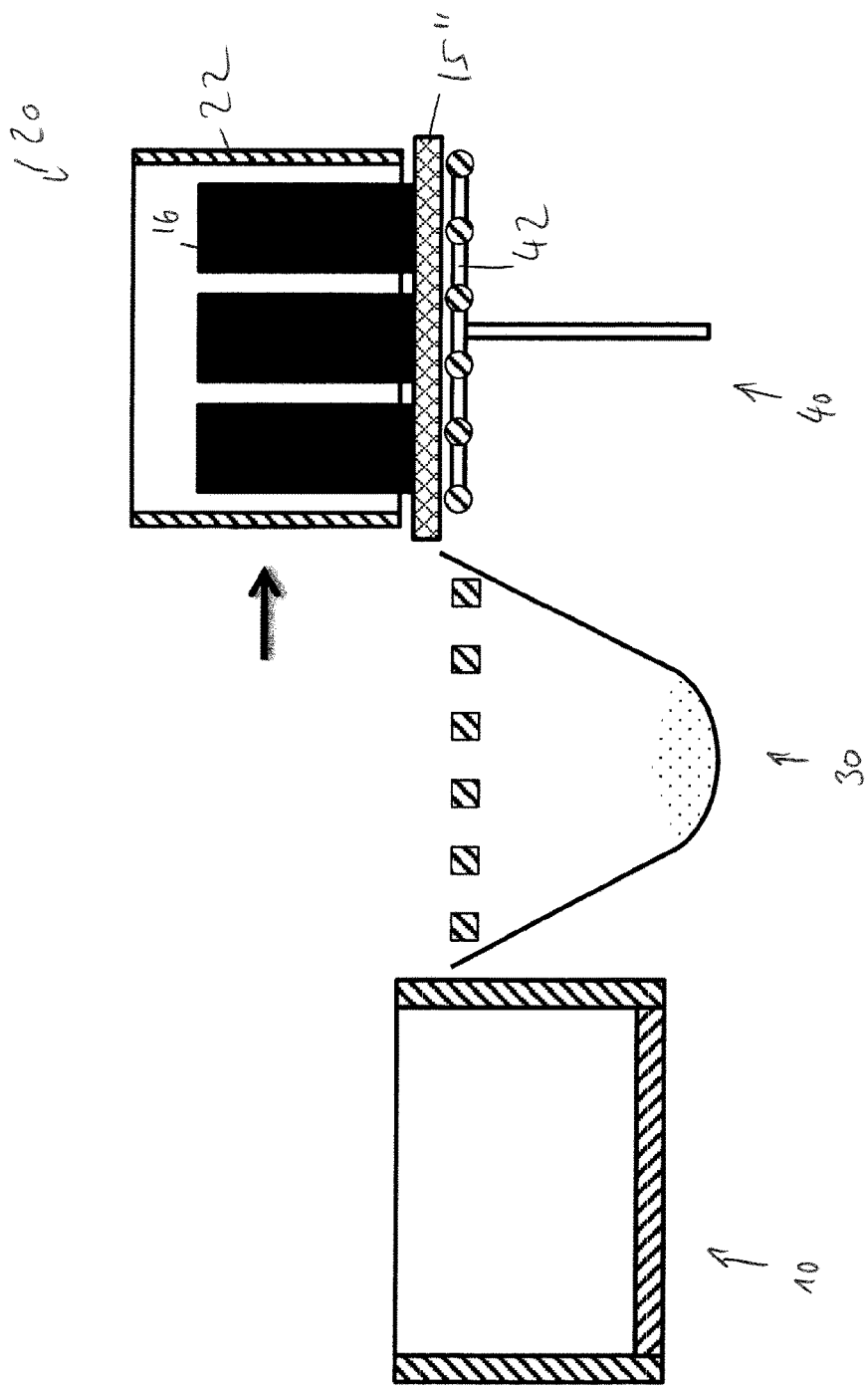

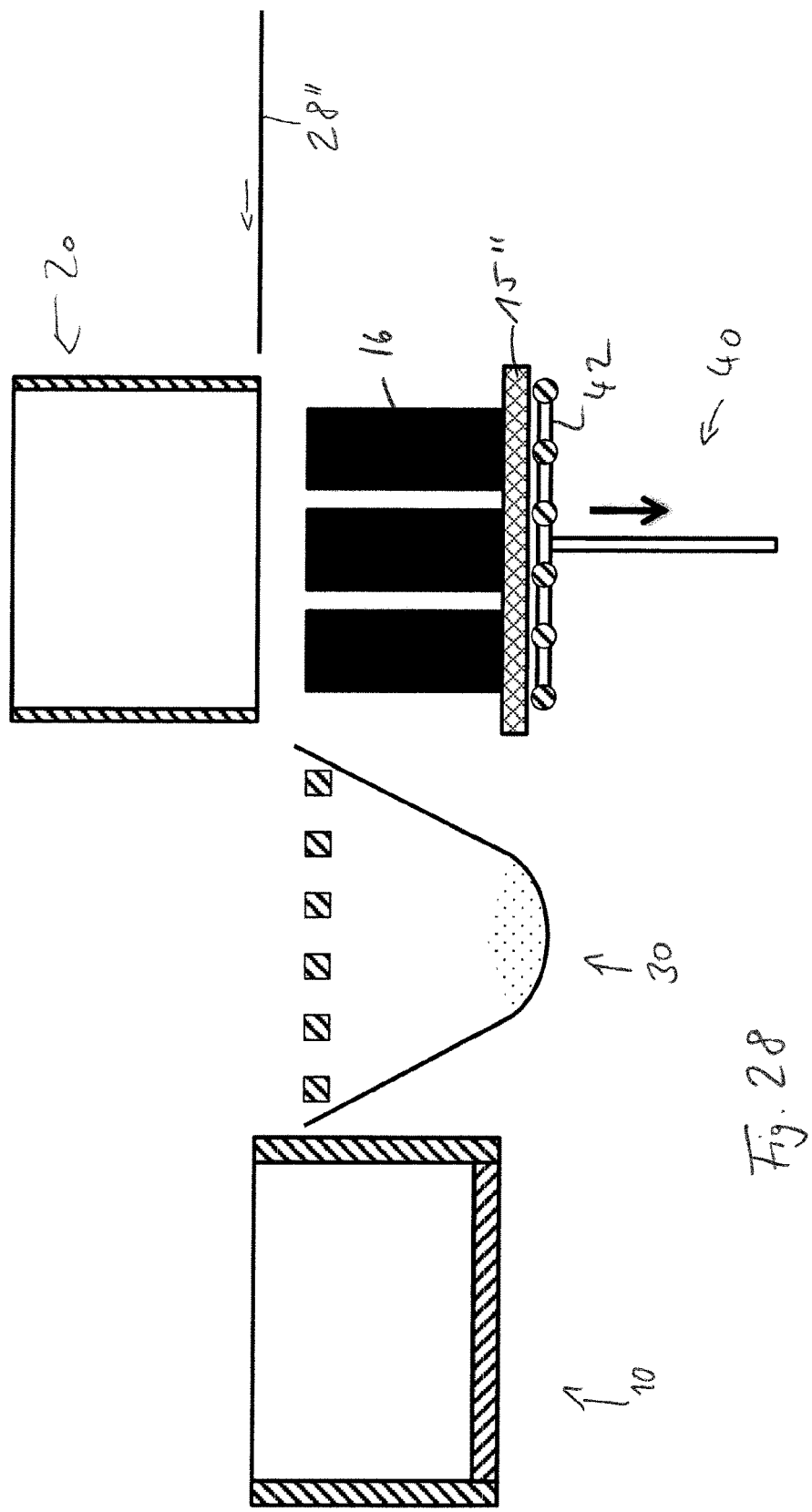

METHOD AND DEVICE FOR UNPACKING A GENERATIVE MANUFACTURED COMPONENT

The present invention relates to a method and a device for unpacking a component produced by means of a generative manufacturing process from a particulate material fill/bulk of unconsolidated particulate material, which, together with the component, is arranged in a receiving space which is limited by a vertical circumferential wall structure of a construction box, open in an upward direction, on a circumferential side, in which construction box a height-adjustable construction platform is received on which the particulate material fill containing the component is arranged.

There are numerous generative manufacturing processes where the component to be produced is constructed in layers from a particulate material/powder material. Individual layers of particulate material are applied one after the other on an entire/continuous area of, for example, a construction platform. In this regard, the respective particulate material layer is selectively solidified in a predetermined partial area thereof, so that the component may be constructed from selectively solidified partial areas lying one upon another and overlapping at least in part. In this respect, manufacturing may be effected in a construction box configured as described initially, the vertical circumferential wall structure of which defines a so-called construction space above the construction platform, when the construction box is located in the associated 3D printer for constructing the component.

Examples of generative manufacturing methods are, for example, the selective printing of a binding agent (for example of a binding agent component of a multi-component binding agent) or selective laser sintering. Generative manufacturing methods (or methods of production in layers) include, in addition to the so-called rapid prototyping, for example also a so-called rapid tooling or a so-called rapid manufacturing.

The component to be produced may, for example, be a mold or a foundry core. The particulate material may, for example, be sand. However, it should be understood that also other particulate material may be used and other components may be produced by means of a respective generative manufacturing method.

In the production of such powder-based components in layers, the objects to be produced are embedded into loose, unsolidified particulate material during the construction process as a result of the selective solidification of a respective layer. In other words, the (at least one) component is (at least in part) surrounded by a particulate material fill of loose, unsolidified particulate material towards the end of the construction process.

This may be advantageous inasmuch as the component is supported by the loose, unsolidified particulate material while being manufactured. However, following the manufacturing process, the component has to be removed from the particulate material fill or has to be separated from the loose, unconsolidated particulate material. This is referred to as the so-called "unpacking" of the component. This so-called unpacking of the component may be followed by a (fine) cleaning thereof, so as to remove particulate material residues adhering to the component. In this regard, unconsolidated particulate material (or "unbound" particulate material) refers to particulate material outside the solidified partial area of a respective layer, i.e., for example, particulate material outside the printing or sintering area of a respective layer or unprinted or unsintered particulate material.

Various methods are known for unpacking powder-based components of this type.

Unpacking may, for example, take place by sucking-off the loose particulate material by means of a high-performance suction device. For this purpose, a first object is exposed from above by means of a suitable suction device (for example a so-called suction lance or a suction hose) until it can be removed from the construction box, for example by hand, following the completion of the component or following the completion of the construction process. Then, the next object is suctioned to become free, removed, etc. In this case, an operator has to expose and remove all components sequentially. As the case may be, several components may be suctioned to become free at the same time in one plane, and may then be removed.

In this respect, the time-consuming suctioning of the loose particulate material by means of the suction device is unfavorable. This applies especially to the case of a large construction space or a large construction box in which a large volume of unconsolidated particulate material is received. Especially in the case of suctioning by hand there is a further risk that objects may be damaged by being contacted with the suction device. Automation of the suction process, for example in such a way that suctioning of the particulate material is effected by means of a robot arm, is only possible with considerable effort, since new and complex sequence programming in the robot is required for new objects. Another drawback of the suctioning method is that the particulate material may be collected in a container and recycled after suctioning with very high effort only. This occurs usually in a separator or in a suitable separating device which separates the particulate material from the suction flow/air flow. Another drawback is that all components contacting the particulate material to be suctioned (for example suction lance, suction hose, separator, etc.) are subject to extensive wear, in particular in the case of a highly abrasive particulate material, such as sand.

As already mentioned, the component may, for example, be constructed on a so-called construction platform, so that the particulate material fill and the component received therein are arranged on the construction platform at the end of the construction process. On the other hand, the construction platform may be received in a so-called construction box. For sufficiently/appropriately pourable particulate material or in the case of a sufficiently/appropriately pourable particulate material fill it may be sufficient to open selectively closable through-holes formed in the construction platform for unpacking the component from the particulate material fill, so that the loose particulate material falls/trickles downward out of the construction space. In many cases, the particulate material may thus drain off/trickle out in a sufficient way. If required, for example if the loose particulate material only drains off in an area directly above the respective opening, so that cavities are formed above the respective opening, (so-called "bridge formation" above the respective opening), the particulate material may be loosened additionally, for example by means of vibration and/or by blowing with air, and/or an intake flow may be used, so as to suck off the particulate material through the through-holes.

For example, WO 2007/139938 A2 (see therein especially FIGS. 3A to 3C) discloses the use of two perforated plates arranged at a vertical distance to each other, the holes of which are arranged to be offset with respect to each other in a horizontal direction. A vacuum is applied to the lower side of the lower perforated plate after constructing the object, and the particulate material is thus sucked off in a downward direction. In addition, the lower perforated plate may be configured to be movable in a horizontal direction relative to the upper perforated plate, in order to align the holes with each other. In other words, the upper perforated plate forms a construction platform having outlet openings, wherein the outlet openings are closed (during the construction process) by the lower perforated plate which is offset. A disadvantage of this embodiment is, on the one hand, the requirement of a sufficiently strong suction flow, and on the other hand a relatively complex construction platform structure.

US 2008/0241404 A1 also discloses a construction platform which is configured so as to discharge unconsolidated particulate material downward through the construction platform out of the construction chamber. See therein, for example, FIG. 1. According to US 2008/0241404 A1, the construction platform comprises a grid member, the openings of which are closed by lower flaps during the construction process. By opening the flaps after the construction process, unconsolidated particulate material can be discharged from the construction chamber.

US 2002/0090410 A1 discloses an unpacking method in which, on the one hand, air is blown-in laterally (on a first side) and, on the other hand, construction material is laterally withdrawn by suction (on a second side opposite the first side) through the lateral construction space wall or the vertical circumferential wall of the construction space. According to US 2002/0090410 A1, unconsolidated particulate material is thus sucked laterally, in combination with a lateral blowing of the unconsolidated particulate material. For this purpose, the lateral wall must be dimensioned to be correspondingly high, since the lateral openings for blowing-in/suctioning should be positioned under the construction platform during the construction process.

Another unpacking method is known from WO 2005/025780. This document proposes to displace the construction platform into a suctioning position after producing the component, and to subsequently unpack the component by means of a lateral suction flow, whereby the unconsolidated construction material is to be removed and the formed body and the carrier or the construction platform are to be cooled. The lateral wall has to be dimensioned to be correspondingly high in this case as well.

Eventually, WO 01/10631 A2 discloses a construction platform which is configured to be porous, wherein a gas is blown-in from the bottom through the pores and the openings, respectively, which generates a kind of fluidized bed and loosens up the particulate material surrounding the object produced. The loose material is removed upwards from the construction space, especially by means of moving the construction platform upwards in connection with tilting the construction space. See for example FIGS. 3 and 4 of WO 01/10631 A2. Tilting the construction space if a fluidized bed is present may result in that the components migrate in the fluidized bed and, for example, impact/collide with one another or with a circumferential wall of the construction space, which may result in damaging the components.

It may be considered as an object of the present invention to provide a method and/or a device which allow a simple but nevertheless reliable removal/unpacking of the component from the particulate material fill, for example also for a large construction space or a large construction box.

The invention provides a method of unpacking a component according to claim 1. Further embodiments of the method according to the invention are described in dependent claims 2 to 11. Claims 12 and 13 describe production methods adapted to the unpacking method according to the invention. Claim 14 describes a device for unpacking a component according to the invention, and claim 15 describes a further embodiment of the device according to the invention.

According to various embodiments, a method and/or a device are provided, which allow a simple but nevertheless reliable removal/unpacking of the component from the particulate material fill, for example also for a large construction space or a large construction box.

According to various embodiments, a method and/or a device are provided which allow an unpacking of the component in such a way that the construction box, in the receiving space of which the manufactured component and the particulate material fill are received, is quickly available for the next construction job.

According to various embodiments, a method and/or a device are provided which are suitable for a construction box which is simple in terms of structure.

According to various embodiments, a method and/or a device are provided by means of which unpacking the component from the particulate material fill can be automated easily or can be effected in a controlled way, i.e. which allow a partially automated or fully automated unpacking of the component.

According to various embodiments, a method and/or a device are provided which allow a quick unpacking of the component from the particulate material fill, for example also for a large construction space or a large construction box.

According to various embodiments, a method and/or a device are provided which allow a cost-effective unpacking of the component from the particulate material fill, for example also for a large construction space or a large construction box.

According to various embodiments, a method and/or a device are provided, by means of which the particulate material separated from the component can be collected easily, for example in order to use the particulate material again.

According to various embodiments, a method and/or a device are provided, by means of which wear and tear of devices contacting the particulate material, occurring during the unpacking process, can be kept at a low level.

According to various embodiments, a method and/or a device are provided, by means of which unpacking may take place in a comparatively low construction box.

The invention describes a method for unpacking a component (for example several components) produced by means of a generative manufacturing method from a particulate material fill of unconsolidated particulate material, which fill is arranged in a receiving space together with the component, which on a circumferential side is limited by a vertical circumferential wall structure, open in an upward direction, of a construction box, in which a height-adjustable construction platform is received, on which the particulate material fill is arranged, containing the component.

For example, the construction box may be a mobile construction box which is capable of being moved back and forth between several positions. For this purpose, the construction box may, for example, be equipped with its own construction box travel drive. One of these positions may be a construction box construction position in a 3D printer which carries out the generative manufacturing process, in which position the construction box forms a construction space in which the component to be produced is manufactured/constructed. Another position may be a construction box unpacking position which is, for example, located outside of the 3D printer and into which the construction box is moved to remove the component from the construction box. A conveyor system (for example in the form of a roller conveyor and/or a rail structure) for the construction box may be provided at least in sections between these two positions.

The construction box may, for example, be equipped with its own construction platform lift drive, by means of which the height-adjustable construction platform can be lowered and lifted. Alternatively, a construction platform lift drive of this type may also be provided at a respectively required position, i.e. for example at the construction box construction position and at the construction box unpacking position. In this case, several construction boxes may use the same lift drive together.

The vertical circumferential wall structure of the construction box may, for example, be rectangular in the plan view, for example with two long and two short sides.

The construction platform may, for example, be configured without through-holes and/or may remain in the construction box during the unpacking process of the component (i.e. it is not removed from the construction box during the unpacking process).

The component may, for example, be manufactured by means of a binding agent printing method, wherein a binding agent (for example a binding agent component of a multi-component binding agent) is selectively printed on a previously applied layer of particulate material, or alternatively, for example, by means of selective laser sintering. However, other generative manufacturing methods are imaginable/possible as well, for example powder-based manufacturing methods. Those skilled in the art are well acquainted with manufacturing methods of this type, and these methods are, for example, described in the above-mentioned documents.

For example, after applying the first particulate material layer to the construction platform by means of a so-called coater, the first particulate material layer may selectively be consolidated/solidified in a partial area thereof, for example by imprinting a suitable binding agent, for example by means of a suitable printing device. Then, the construction platform may be lowered downward by one layer thickness, a second particulate material layer may be applied onto the first particulate material layer, and the second particulate material layer may selectively be consolidated in a partial area thereof. These steps may be repeated until the component is completed. A suitable printing device, a suitable coater, a suitable construction box and a suitable installation to be used in such a method are, for example, described in the following applications/patents, the disclosure content of which is incorporated herein by this reference: DE 10 2009 056 695, DE 10 2009 056 688, DE 10 2009 056 689, DE 10 2009 056 686, DE 10 2009 056 696, DE 10 2009 056 694, and DE 10 2009 056 687.

A particulate material fill of an unconsolidated particulate material is received by the construction box in its construction space or receiving space at the end of the construction process/manufacturing process, in which the one or more components are contained or embedded. In other words, the at least one component is surrounded by the particulate material fill at least in part. Several components may, for example, be arranged in a common horizontal layer or plane within the construction space (in which case they have been manufactured at the same time or next to each other) and/or may be arranged in a vertical direction one upon the other within the construction space (in which case they have been manufactured one after another).

The at least one component is made of consolidated particulate material (respectively of selectively consolidated partial areas of successive particulate material layers), and may, for example, be a casting mold or a foundry core, for example a sand casting mold or a sand foundry core.

The particulate material (or "construction material") may, for example, comprise sand particles. For example, sand particles may be used for the particulate material, which are selected from the group consisting of quartz sand particles, aluminum oxide sand particles, zircon sand particles, olivine sand particles, silicate sand particles, chromite sand particles and combinations thereof. The particulate material may, however, comprise other construction particles as well, for example metal or synthetic material particles, so that the invention is not limited to the use of sand particles. The particulate material may for example have construction particles having an average particle size of 90 to 250 µm, for example an average particle size of 90 to 200 µm, for example an average particle size of 110 to 180 µm. In addition to so-called construction particles, of which the component is primarily composed, the particulate material may also comprise additives, for example a component of a multi-component binder. The additives may be present in liquid and/or solid form.

Following its production, the component embedded into the particulate material fill must be freed sufficiently from the unconsolidated particulate material in a so-called unpacking step. In other words, the component is exposed in a sufficient way during this step. In this regard, the term unconsolidated particulate material refers to particles which are not bound to other particles, thereby forming the component, i.e., particles outside the respective, selectively consolidated partial area of a layer.

According to the invention, the actual unpacking does not take place within the construction space or within the construction box, as in accordance with common practice in the state of the art, but the particulate material fill (or rather the "layer stack of unconsolidated particulate material") is first transferred into an auxiliary frame together with the component, which frame is arranged vertically above the construction box for this purpose.

The construction box is therefore quickly available for a subsequent construction job. In addition, the construction box, including its construction platform, may be configured to be simple in terms of its structure. It is, for example, not necessary to provide the construction box with an elevated side wall structure and/or a perforated construction platform with a closing device.

In the further course, the component transferred into the auxiliary frame can be unpacked from the particulate material fill without any difficulty and can be removed from the auxiliary frame. In this respect, the method is also suitable for large construction boxes and allows a simple and reliable unpacking. The unpacking process may take place relatively quickly and at reasonable costs.

In addition, the described process is suitable for carrying out the unpacking process of the component at least in part in an automated manner.

In detail, the following steps are carried out in the method:
an auxiliary frame having a vertical circumferential wall structure open in a downward direction and configured to receive the particulate material fill containing the component, is arranged vertically above the vertical circumferential wall structure of the construction box,
the construction platform is displaced upward, so that the particulate material fill containing the component is transferred from the construction box to the auxiliary frame and is received in the latter, the auxiliary frame with the particulate material fill containing the component and received therein and the construction box are moved away from each other, so that the latter is free for the next construction job, and the component is unpacked at least in part from the particulate material fill and is removed from the auxiliary frame.

For example, the auxiliary frame is arranged with its vertical circumferential wall structure substantially as an extension of the vertical circumferential wall structure of the construction box. In other words, both vertical circumferential wall structures may substantially be aligned.

For example, the auxiliary frame may rest directly on the construction box or may, for example, be arranged vertically adjacent to the construction box above the same, for example with vertical play, i.e. at a small vertical distance.

The construction box may, for example, be arranged or moved into the above-described construction box unpacking position at the time of arranging the auxiliary frame above the construction box.

Displacing the construction platform upward may, for example, be effected using the above-described integrated construction box lift drive or a "shared" lift drive.

The construction platform is, for example, moved upward substantially as far as the upper edge of its vertical circumferential wall structure or close to the same.

In order to move the auxiliary frame with the particulate material fill containing the component received therein and the construction box away from each other, the construction box and/or the auxiliary frame may, for example be moved, for example (respectively) laterally or horizontally (see below). Even if a lateral movement has proved its worth in practice, it is basically possible, for example, to carry out a vertical movement as an alternative, for example to move the auxiliary frame upward (see below).

According to various exemplary embodiments, the component received in the auxiliary frame may, for example, be unpacked from the particulate material fill at least in part by removing particulate material of the particulate material fill from the auxiliary frame through the lower opening of the auxiliary frame, for example by the particulate material trickling downward and out of the same. The component may, for example, first be retained, or may, as an alternative, be removed together with the unconsolidated particulate material through the lower opening from the interior of the auxiliary frame. However, it is basically also possible to discharge, for example to withdraw by suction the particulate material through an upper opening of the auxiliary frame, even if this method may be time-consuming. If the particulate material of the particulate material fill is removed from the auxiliary frame through the lower opening of the auxiliary frame, for example by trickling downward and out of the same, the particulate material fill may, if required (for example in the case of particulate material with poor trickling behavior), be additionally blown by a fluid stream (for example pressure fluid, for example pressure gas, for example pressurized air), in order to loosen the particulate material at least in sections (in this respect, the entire particulate material fill may, for example, be transferred into a fluidized bed). For this purpose, corresponding nozzles for blowing against the particulate material fill from below may be attached to a porous, plate-shaped structure and/or discharge structure (for example in the form of a grid or a sieve) as described below.

According to various exemplary embodiments, the component may, for example, be removed from the auxiliary frame by moving the auxiliary frame and the component relative to each other.

According to various exemplary embodiments, unpacking and removing may take place simultaneously, in an overlapping way or successively.

In order to unpack the component at least in part from the particulate material fill and in order to remove it from the auxiliary frame, the auxiliary frame may, according to a simple exemplary embodiment, be moved laterally over a table arranged adjacent to the construction box. If the auxiliary frame is subsequently drawn upward or separated from the particulate material fill, the particulate material fill or rather the "layer stack of unconsolidated particulate material" spreads sideward, and the component can be removed from the particulate material fill, if necessary following another exposing by means of, for example, a brush.

Alternatively, the auxiliary frame may, for example, be moved in a lateral direction to be positioned vertically above a slide, so that the component and the particulate material fill can be removed from the auxiliary frame together through the lower opening of the auxiliary frame along the slide.

Analogously, according to another simple and exemplary embodiment, the auxiliary frame may, for example, be moved laterally over a porous particulate material discharge structure arranged adjacent to the construction box (for example in the form of a grid or sieve), so that the unconsolidated particulate material of the particulate material fill may trickle off downward through the particulate material discharge structure, the component being retained by the porous particulate material discharge structure. The porous particulate material discharge structure may, for example, be attached to or above a particulate material collecting vessel.

According to various embodiments, the auxiliary frame may, for example, be moved relatively over a plate-shaped structure, or may be arranged above the same, or a plate-shaped structure may be provided in the construction box between the construction platform and the particulate material fill containing the component, and may be transferred to the auxiliary frame together with the particulate material fill (also see below). The plate-shaped structure and the auxiliary frame may, for example, be moved away from each other for unpacking the component, so that the particulate material fill (optionally together with the component) may be discharged through the lower opening of the auxiliary frame, for example onto a porous particulate material discharge structure. The respective plate-shaped structure may, for example, be configured to be porous, i.e. pervious to unconsolidated particulate material, thereby facilitating the handling of the components. In this case, the component may, for example, be retained by the plate-shaped structure, while unconsolidated particulate material trickles downward through the plate-shaped structure.

In this respect, the porous, plate-shaped structure may, for example, be formed by a sieve and/or a grid and/or a perforated plate.

The porous, plate-shaped structure may, for example, be made of metal.

The porous, plate-shaped structure may be configured to let unconsolidated particulate material trickle-through downward, to thereby unpack the component at least in part. The porous, plate-shaped structure may further be configured to retain the component.

The at least partial unpacking may thus take place through the porous, plate-shaped structure.

According to various embodiments, a plate-shaped structure which may, for example, be formed to be porous (i.e. pervious to unconsolidated particulate material) may be arranged in the construction box between the construction platform and the particulate material fill containing the component, wherein the plate-shaped structure is transferred from the construction box to the auxiliary frame together with the particulate material fill arranged thereon and containing the component, and is moved relatively away from the construction box together with the particulate material fill and the auxiliary frame, for example into a position vertically above a particulate material collecting device.

For example, the auxiliary frame, the particulate material fill and the plate-shaped structure may be moved laterally or rather horizontally into the position vertically above the particulate material collecting device.

The plate-shaped structure received in the construction box may, for example, have substantially the same size as the construction platform.

The plate-shaped structure may, for example, be fixed to the auxiliary frame after having been transferred to the same, for example by means of a locking/fixing structure, for example comprising one or more linearly displaceable bolts which engage with a respective recess of the plate-shaped structure. In this case, the auxiliary frame may, for example, also be moved vertically away from the construction box, or may, for example following a lateral moving-away, be moved freely, i.e. without the requirement to support the plate-shaped structure from below.

It is, however, not necessary to fix the auxiliary frame and the plate-shaped structure to each other or to interlock them, and the plate-shaped structure may, for example, be supported from below during a relative moving-away of the auxiliary frame, for example on an appropriate rack or on a porous particulate material discharge structure (for example in the form of a grid or sieve).

According to various embodiments, the auxiliary frame with the particulate material fill containing the component and received therein and the construction box may be moved away from each other laterally, for example by laterally moving the auxiliary frame with the particulate material fill received therein and containing the component, for example along a guiding structure.

When moving them laterally away from each other, the particulate material fill may, for example, be arranged on, for example be pushed onto a horizontal support structure. The horizontal support structure may, for example, be formed by a grating and/or a plate-shaped structure which is, for example, porous.

According to various embodiments, the auxiliary frame with the particulate material fill received therein and containing the component may be arranged vertically above an ("external") plate-shaped structure which may, for example, be configured to be porous (i.e., impervious to unconsolidated particulate material), or rather may be moved relatively over the same. The "external" plate-shaped structure may, for example, be arranged laterally next to the construction box substantially at the height of its upper edge area. In this case, the auxiliary frame may be moved relatively sideward upon transfer of the particulate material fill (for example may be moved itself) into a position vertically above (for example directly on) the plate-shaped structure. In this respect, the plate-shaped structure may, for example, be formed to be greater than the construction platform, for example also greater than the construction box.

According to various embodiments, the plate-shaped structure may be arranged above a particulate material collecting device, or the auxiliary frame may be moved with the particulate material fill received therein and containing the component first over the plate-shaped structure and then with the plate-shaped structure over the particulate material collecting device.

For example, the particulate material collecting device may comprise a particulate material collecting vessel and/or a porous particulate material discharge structure.

According to various embodiments, the through-holes of the porous, plate-shaped structure may be filled with particulate material and/or may be covered (for example at least temporarily) during a lateral relative movement between the auxiliary frame and the porous, plate-shaped structure (in order to bring the auxiliary frame to a position vertically above the porous, plate-shaped structure), in order to reduce a discharge of particulate material from the auxiliary frame. This allows to prevent the component from rubbing against the porous, plate-shaped structure and from being damaged as a result thereof. In other words, it is possible to prevent the component from sinking as a result of the discharge of particulate material and from contacting the porous, plate-shaped structure before the auxiliary frame has been arranged completely over the porous, plate-shaped structure. The openings may, for example, be covered by means of a plate structure, for example by means of a slide/pusher plate, which may for example be arranged above or below the porous, plate-shaped structure.

According to various embodiments, the particulate material fill containing the component may be arranged on a porous, plate-shaped structure, for example on a porous, plate-shaped structure as described above during the at least partial unpacking of the component from the particulate material fill. In addition/in this state the particulate material fill containing the component may, for example, be surrounded circumferentially by the auxiliary frame. The porous, plate-shaped structure may in turn be arranged above a particulate material collecting device. The particulate material collecting device may, for example, be arranged next to the construction box.

According to various embodiments, the at least partially unpacked component may be moved to a component transfer station together with the porous plate-shaped structure and the auxiliary frame, where the component and the porous, plate-shaped structure are separated from the auxiliary frame and from where the component is, for example, fed to a component stock, for example together with the porous, plate-shaped structure. The component transfer station may, for example, be arranged next to the particulate material collecting device. The component transfer station may, for example, comprise a height-adjustable deposit structure for depositing the porous, plate-shaped structure. It may, for example, be displaced downward, in order to separate/remove the porous, plate-shaped structure from the auxiliary frame together with the component arranged thereon. The optional component stock may, for example, be arranged next to the component transfer station. The component stock may, for example, be a shelf in which several components can be received.

According to various embodiments, the construction box may at the beginning of the process be arranged in a construction box unpacking position next to a particulate material collecting device, wherein the auxiliary frame is movable/moved from the construction box unpacking position to the particulate material collecting device, optionally via the particulate material collecting device further to the above-mentioned transfer station, along a guiding structure.

The guiding structure may, for example, be a horizontal guiding structure. The guiding structure may, for example, be a linear guiding structure.

According to various embodiments, the following may apply:

the vertical circumferential wall structure of the auxiliary frame may additionally be open upward (in this case, a fluid stream may, for example, be directed to the particulate material fill and/or the component through the upper opening), and/or the vertical circumferential wall structure of the auxiliary frame may have a height which is greater than or equal to the height of the vertical circumferential wall structure of the construction box, and/or a space limited by the vertical circumferential wall structure of the auxiliary frame and a space limited by the vertical circumferential wall structure of the construction box may have the same shape and/or the same size in a horizontal section, and/or the auxiliary frame may be provided with a cleaning device which is configured to clean the construction platform moved upward, while the auxiliary frame is moved laterally relative to the construction box with the particulate material fill containing the component received therein. The cleaning device may, for example, be mounted to an outer face of the vertical circumferential wall structure. The cleaning device may, for example, comprise a stripping/wiping member, for example a brush.

According to various embodiments of the invention, the steps of arranging the auxiliary frame above the vertical circumferential wall structure of the construction box and/or moving/displacing the construction platform upward and/or moving the auxiliary frame and the construction box away from each other and/or at least partially unpacking the component and/or removing the component and the auxiliary frame from each other and/or first arranging the construction box in a construction box unpacking position next to a particulate material collecting device and/or moving the unpacked component together with the porous, plate-shaped structure and the auxiliary frame to a component transfer station and/or separating the component and the porous, plate-shaped structure from the auxiliary frame and/or feeding the unpacked component to a component stock may take place in an automated manner.

According to various embodiments of the invention, a method may be provided for producing one or more components by means of a generative manufacturing process in combination with a method for unpacking the components manufactured in this way as described above.

In this respect, all components are, in a top view, produced next to each other, for example in a single horizontal component layer in the construction space formed by the construction box in the generative manufacturing method.

Alternatively or in addition, the component or one or more or all of the components comprise a respective support or holding structure which in the generative manufacturing method is formed together with the respective component, whereby, when unpacking the components, for example when the unconsolidated particulate material is discharged downward from the auxiliary frame, a damaging of the respective component and/or a covering of one or more openings (of for example the porous, plate-shaped structure) by the component is avoided. In this respect, in the generative manufacturing method, one or more holding frames may be co-formed, where respectively one or more components are held by their respective support or holding structure, and/or several components may be connected to each other by their respective support or holding structure, and/or the component or one or more or all of the components may be connected by their respective support or holding structure with the (for example porous) plate-shaped structure received in the construction box.

According to various embodiments of the invention, a method for producing one or more components by means of a generative production process may be provided, for example in combination with a method for unpacking the components manufactured in this manner as described above.

According to the method, the one or more components are produced in a construction space which is circumferentially limited by a vertical circumferential wall structure, open upward, of a mobile construction box, wherein a height-adjustable construction platform is received in the construction box, which is lowered in the course of the manufacturing process, to build a particulate material fill containing the component above the construction platform using the manufacturing method.

Prior to the construction process, a (for example porous) plate-shaped structure is arranged on the construction platform of the mobile construction box (which may be formed as described above), which for unpacking the one or more components after their production can be removed from the construction box together with the particulate material fill containing the component by moving the construction platform upward, and can be transferred into an auxiliary frame.

The construction box may, for example, be arranged in a 3D printer during the construction process, and may be moved out of the same and into a construction box unpacking position for unpacking. The plate-shaped structure may, for example, be placed on the construction platform to be loose prior to the construction process. In the event of a porous, plate-shaped structure, the holes of the porous, plate-shaped structure may be filled at the beginning of the construction process and one or more "sacrifice" layers may optionally be positioned on the porous, plate-shaped structure. The construction platform itself may be free from through-holes. The construction platform is, for example, configured to be substantially moved up to the upper edge of the vertical circumferential wall structure, so that the plate-shaped structure may be removed from the construction box for unpacking the one or more components following their manufacture by moving the construction platform upward together with the particulate material fill containing the component, and may be transferred to the auxiliary frame.

According to various embodiments of the invention, a device is provided for unpacking a component produced by means of a generative manufacturing method from a particulate material fill of unconsolidated particulate material, which is arranged in a receiving space together with the component, which space is circumferentially limited by a vertical circumferential wall structure, open upward, of a mobile construction box, in which a height-adjustable construction platform is received, on which the particulate material fill containing the component is arranged, and which can be moved into a construction box unpacking position, wherein the device comprises:

an auxiliary frame having a vertical circumferential wall structure open downward, and being movable along a guiding structure from a first position, in which it is arranged vertically above the vertical circumferential wall structure of a mobile construction box displaced into its construction box unpacking position, into a second position, and a particulate material collecting device arranged vertically underneath the auxiliary frame when it is located in the second position.

The first and second positions may, for example, be arranged to be horizontally adjacent to each other. The guiding structure may, for example, be a horizontal guiding structure. The guiding structure may, for example, be a linear guiding structure.

The particulate material collecting device may, for example, have such a height that its upper edge area is substantially disposed on a level with an upper edge area of the construction box in its construction box unpacking position or somewhat thereunder.

The particulate material collecting device may, for example, comprise a porous particulate material discharge structure (for example in the form of a grid or sieve), which may, for example, serve as a support structure for the porous, plate-shaped structure, and/or a particulate material collecting vessel.

A blowing device may, for example, be provided above the auxiliary frame in the second position thereof, which is configured to direct a fluid jet (for example an air jet) onto the component through an upper opening of the auxiliary frame.

The device may, for example, further comprise the construction box.

According to various embodiments, the device may further comprise:

a component transfer station, wherein the auxiliary frame is movable along the guiding structure from the first position via the second position into the third position, and wherein the auxiliary frame is arranged vertically above the component transfer station in the third position, and/or a control device configured to carry out one or more or all of the steps of the above method in an automated manner.

The second position and the third position may, for example, be arranged to be horizontally adjacent to each other.

The component transfer station may be configured as described above, i.e. may, for example, comprise a height-adjustable deposit structure for depositing the plate-shaped structure, which is substantially (at least) movable up to the height of the above edge area of the particulate material collecting device.

The device may, for example, further comprise the above-described component stock.

The device may, for example, further comprise a stock of plate-shaped structures, so that the auxiliary frame is able to load an emptied construction box with a new plate-shaped structure for a next construction job.

Further characteristics and advantages of the present invention are illustrated or described in detail in the attached drawings incorporated herein, as well as in the following detailed description, which together shall serve to illustrate certain principles of the present invention.

The invention will hereinafter be exemplified in detail based on different embodiments and with reference to the drawings.

FIGS. 1a and 1b show a device for unpacking a component manufactured by means of a generative manufacturing process from a particulate material fill of unconsolidated particulate material according to a first embodiment of the invention;

FIGS. 22 to 28 show a device and a method for unpacking a component manufactured by means of a generative manufacturing process from a particulate material fill of unconsolidated particulate material according to a fourth embodiment of the invention.

In the Figures, identical or similar members are provided with identical reference numbers where appropriate.

Figure 2A:
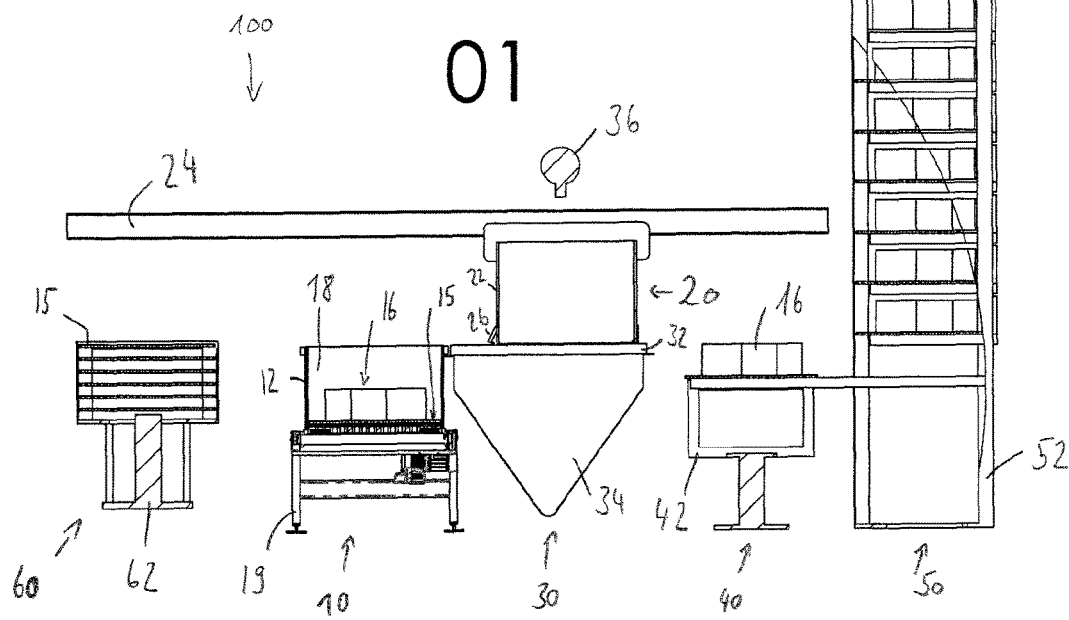
FIGS. 2a to 5b show a method for unpacking a component manufactured by means of a generative manufacturing process from a particulate material fill of unconsolidated particulate material according to a first embodiment of the invention, which uses the device of FIGS. 1a and 1b.

FIGS. 1a and 1b show a device 100 for unpacking a component manufactured by means of a generative manufacturing process from a particulate material fill of unconsolidated particulate material (hereinafter also referred to as "unpacking device") which fill is arranged in a receiving space together with the component, which receiving space is circumferentially limited by a vertical circumferential wall structure of a mobile construction box, which is open in an upward direction, in which a height-adjustable construction platform is received on which the particulate material fill containing the component is arranged, and which can be displaced into a construction box unpacking position. As shown by FIGS. 1a and 1b, the construction box unpacking position is disposed outside a 3D printer (not shown), in which the component was manufactured in a construction space formed by the construction box, for example by means of selectively printing a binder or by means of selective laser sintering.

As shown by FIGS. 1a and 1b, the device 100 comprises: the construction box 10, an auxiliary frame 20, a particulate material collecting device 30, an optional component transfer station 40, an optional component stock 50 and an optional stock 60 of porous, plate-shaped structures 15. These components will now be described in detail.

The construction box 10 has a vertical circumferential wall structure 12 which is open in an upward direction. As shown, the vertical circumferential wall structure 12 may, for example, be configured to be rectangular when viewed from above.

Here, the construction box 10 is, by way of example, configured as a mobile construction box 10 which can be moved back and forth at least between a construction box construction position in which the construction box is arranged in the 3D printer (not shown), in order to manufacture the component in the construction space formed by the construction box, and the construction box unpacking position. In this respect, FIG. 1a suggests an optional conveying system (here, by way of example, in the shape of a roller conveyor 19), on/by means of which the construction box 10 can be displaced into its construction box unpacking position. In its construction box unpacking position, the construction box 10 may, for example, be fixed and/or oriented in a predetermined position. It shall be understood that the invention is, however, not limited to a mobile construction box, even if it is well suited for such a mobile construction box.

A height-adjustable construction platform 14 is received within the construction box 10, on which the component or the layer stack including the component is constructed during the manufacturing process. At the beginning of the manufacturing process, the construction platform 14 can be displaced upward. During the manufacturing process, the construction platform 14 may be lowered gradually by respectively one layer thickness. At the end of the manufacturing process, the construction platform 14 is displaced downward by a predetermined amount, and a particulate material fill 18 is arranged above the construction platform, which contains the at least one component 16. During the manufacturing process and the unpacking process, the construction platform 14 may be driven by its own lift drive integrated in the construction box 10, or, alternatively, may be driven by means of a stationary lift drive which is installed in the 3D printer or the unpacking device in a stationary manner.

The auxiliary frame 20 has a vertical circumferential wall structure 22 which is open in a downward direction. For example, the vertical circumferential wall structure 22 may also be open in an upward direction. Here, the auxiliary frame 20 is, for example, displaceable along a guiding structure 24. As shown, the guiding structure may be configured as a horizontal guiding structure (for example as a horizontal linear guiding structure), along which the auxiliary frame can be displaced horizontally. The auxiliary frame 20 can be displaced along the guiding structure 24 at least between a first position and a second position, optionally also into a third position in which it is arranged vertically above the optional component transfer station 40, and/or a fourth position in which it is arranged vertically above the optional stock 60. In the first position, the auxiliary frame 20 is arranged vertically above the vertical circumferential wall structure 12 of the construction box 10 (when it is located in its construction box unpacking position), and in the second position, the auxiliary frame 20 is arranged vertically above the particulate material collecting device 30 which is described below. In this respect, the auxiliary frame 20 is located between the first and second positions in FIGS. 1a and 1b.

Moreover, the auxiliary frame 20 may comprise an optional cleaning device 26, by means of which the platform 14, which has been displaced upwards, can be cleaned (for example wiped off), while the auxiliary frame 20 is moved from the first into the second position; see FIG. 1b.

The particulate material collecting device 30 is arranged vertically underneath the auxiliary frame 20, when the latter is located in the second position. The particulate material collecting device 30 may, for example, be arranged next to the construction box 10 when it is located in its construction box unpacking position. As shown in FIG. 1b, the particulate material collecting device 30 may, for example, have such a height that its upper edge area (for example formed by the later described porous particulate material discharge structure 32) is arranged substantially on the same level as an upper edge area of the construction box 10 in its construction box unpacking position.

The particulate material collecting device 30 may, for example, comprise a particulate material collecting vessel 34, for example in the shape of a trough which is funnel-shaped in cross-section. The particulate material collecting device 30 may, for example, further comprise a porous particulate material discharge structure 32, for example in the form of a grid or sieve. The porous particulate material discharge structure 32 may, for example, serve as a support for the component and/or the porous, plate-shaped structure 15 during the unpacking process. The porous particulate material discharge structure 32 may, for example, be arranged on or above the particulate material collecting vessel 34.

An optional blowing device 36 may be arranged vertically above the particulate material collecting device 30 (and vertically above the auxiliary frame 20 in its second position), which is configured to direct a fluid jet (for example an air jet) onto the component 16 through the upper opening of the auxiliary frame 20. The blowing device 36 may, for example, comprise one or more blowing nozzles which, for example, generate a vertical air curtain which blows particulate material off the component while the component is moved past the blowing device together with the auxiliary frame.

The optional component transfer station 40 is arranged vertically below the auxiliary frame 20, when the latter is located in the third position. The component transfer station 40 may, for example, be arranged next to the particulate material collecting device 30.

As shown in FIG. 1b, the component transfer station 40 may, for example, comprise a deposit structure/support structure 42 for depositing/supporting the component 16 and/or the porous, plate-shaped structure 15. The support structure 42 may, for example, be height-adjustable and may, for example, be configured to be displaceable at least up to the level of the upper edge area of the particulate material collecting device 30. Lowering the support structure 42 allows to separate the component and/or the porous, plate-shaped structure 15 from the auxiliary frame. The auxiliary frame is thus free for a next construction box. FIG. 1b shows the support structure in a lowered position.

The optional component stock 50 may, for example, be arranged next to the component transfer station 40. For example, the component stock 50 may comprise a component stock shelf 52 where a plurality of components 16 may be stored, for example together with a respective porous, plate-shaped structure 15. The component stock 50 and the component transfer station 40 may, for example, be configured in such a way that a component 16 transferred from the auxiliary frame 20 to the component transfer station 40 is accommodated automatically in a free position in the shelf 52.

The optional stock 60 of porous, plate-shaped structures 15 may, for example, be arranged next to the construction box 10 when it is in its construction box unpacking position. The stock 60 has a holding structure 62 which holds a plurality of porous, plate-shaped structures 15, so that the auxiliary frame 20 can provide an emptied construction box 10 with a new porous, plate-shaped structure 15 for a next construction job. For this purpose, the auxiliary frame may be moved into its fourth position above the stock 60, take a porous, plate-shaped structure 15, be moved to the first position again, and may transfer the porous, plate-shaped structure 15 to the construction box 10. For seizing the porous, plate-shaped structure 15 in the fourth position, the auxiliary frame 20 may, for example, be equipped with a locking device, for example comprising one or more linearly displaceable bolts selectively engaging with a respective recess of the plate-shaped structure. The locking device may also be used during the unpacking process to fix the plate-shaped structure to the auxiliary frame after the plate-shaped structure has been transferred from the construction box to the auxiliary frame.

In this regard, please note that, according to the present embodiment, a porous, plate-shaped structure 15 is arranged on the construction platform 14 of the construction box 10 prior to the construction process, which is later removed from the construction box for unpacking the one or more components 16 following their manufacture by means of displacing the construction platform upward together with the particulate material fill 18 containing the component 16, and is transferred into the auxiliary frame 20. This is suggested by FIG. 1b and will be described later in detail.

The porous, plate-shaped structure 15 may, for example, be formed by a perforated plate. The porous, plate-shaped structure 15 may, for example, be made of metal.

The unpacking device 100 may further comprise a control device (not shown) which is configured to control one or more or all of the following processes:

displacing the construction box 10 into the construction box unpacking position, for example starting from the construction box construction position, displacing the auxiliary frame 20 along its guiding structure 24, lifting the construction platform 14 when the construction box is in its unpacking position and the auxiliary frame is arranged in its first position, lifting and lowering the deposit structure 42 of the transfer station 40, storing the component 16 from the transfer station 40 into the stock 50, blowing off the component by means of the blowing device 36, locking a porous, plate-shaped structure 15 to the auxiliary frame 20.

With reference to FIGS. 2a to 5b, a method according to a first embodiment of the invention will now be described for unpacking a component 16 manufactured by means of a generative manufacturing process from a particulate material fill 18 of unconsolidated particulate material (hereinafter also referred to as "unpacking process"), which is arranged together with the component in a receiving space which on its circumferential side is limited by a vertical circumferential wall structure 12 of a construction box 10, which is open in an upward direction, in which a height-adjustable construction platform 14 is received, on which the particulate material fill containing the component is arranged.

Figure 2B:
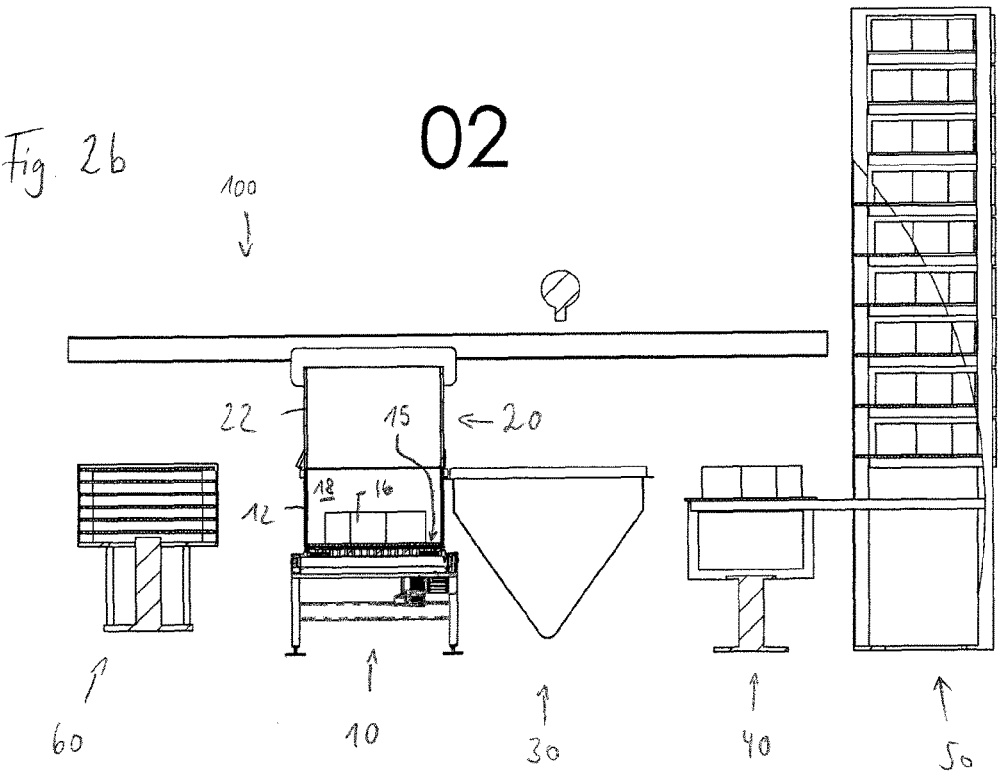

In the unpacking process according to the first embodiment of the invention, the auxiliary frame 20 having the vertical circumferential wall structure 22 open in a downward direction, and configured to receive the particulate material fill 18 containing the component 16 is first arranged vertically above the vertical circumferential wall structure 12 of the construction box 10. This is illustrated in FIGS. 2a and 2b. In other words, the auxiliary frame is arranged in its first position.

As illustrated by FIG. 2b, the vertical circumferential wall structure 22 of the auxiliary frame 20 is, for example, arranged as an extension of the vertical circumferential wall structure 12 of the construction box 10 in this regard, for example with vertical play. The construction box is in its construction box unpacking position and receives a particulate material fill 18 of unconsolidated particulate material containing one or more components 16. Here, the particulate material fill 18 is arranged on a porous, plate-shaped structure 15 by way of example, which in turn is arranged on the construction platform 14, i.e., the porous, plate-shaped structure 15 is arranged between the construction platform 14 and the particulate material fill 18 containing the component 16 in the construction box 10.

Figure 3A:
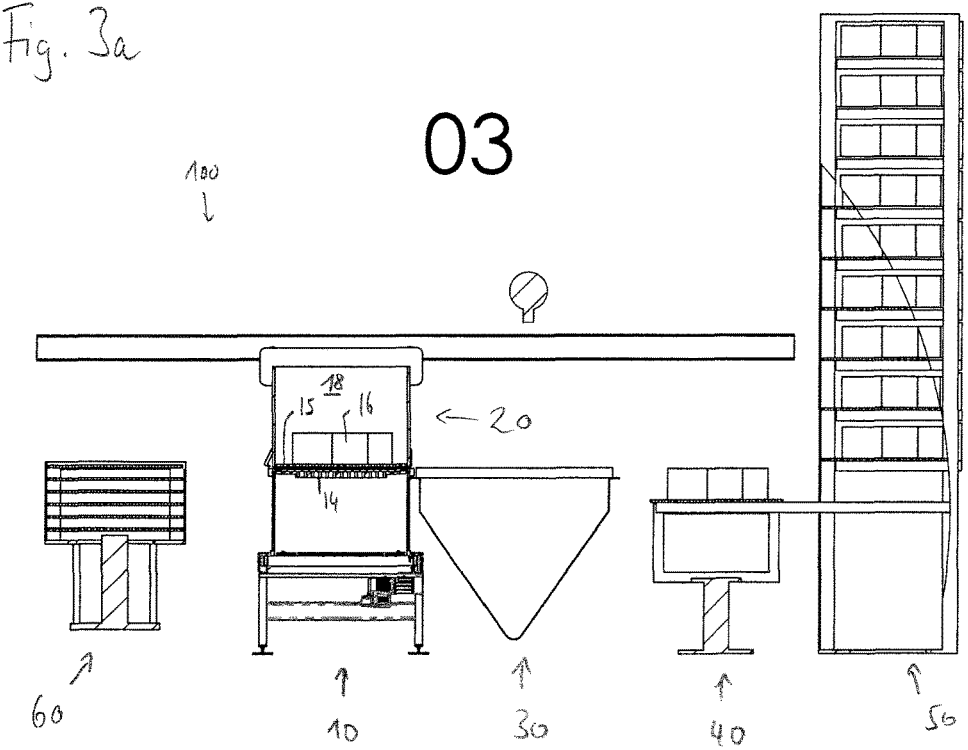

As suggested by FIG. 3a, the construction platform 14 is then displaced upward in the unpacking process according to this embodiment, so that the particulate material fill 18 containing the component 16 is transferred from the construction box 10 to the auxiliary frame 20 and is received in the latter. According to this embodiment, the porous, plate-shaped structure 15 is also transferred to the auxiliary frame 20 in this regard, or is rather moved into its cavity.

Figure 3B:
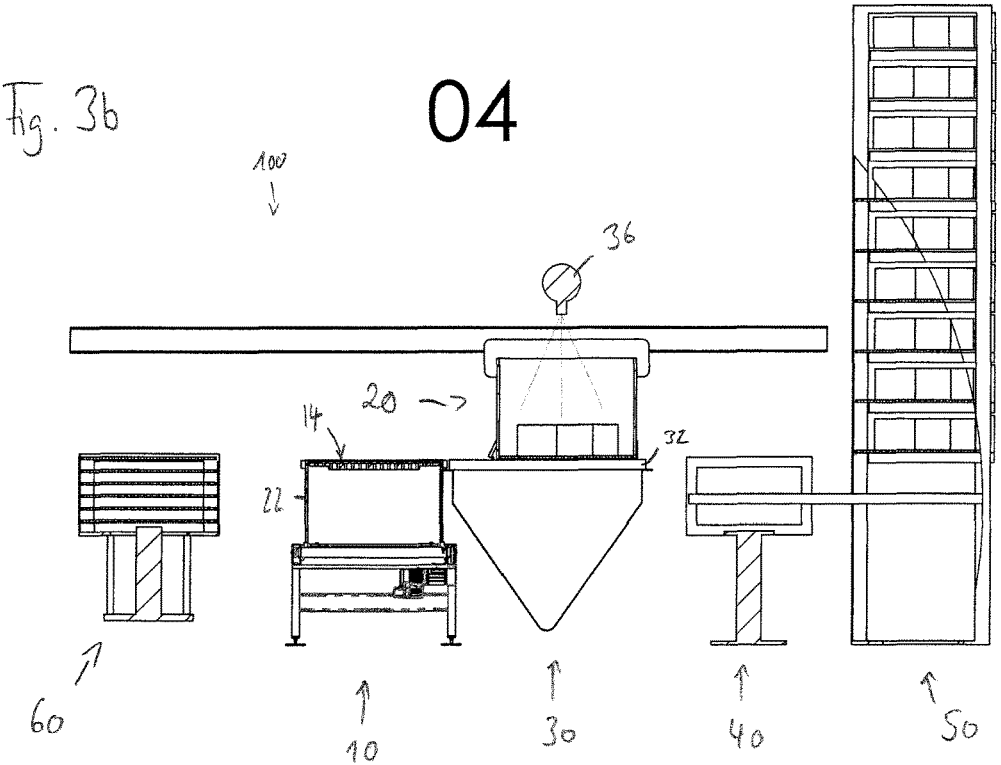

As suggested by FIG. 3b, the auxiliary frame 20 with the particulate material fill 18 containing the component, received therein, and the construction box 10 are then moved apart in the unpacking process according to this embodiment, so that the construction box 10 is free for a next construction job. According to this embodiment, the porous, plate-shaped structure 15 is relatively moved away from the construction box 10 in this regard, together with the particulate material fill 18 and the auxiliary frame 20. As shown, the auxiliary frame 20 with the particulate material fill 18 containing the component 16, received therein, may, for example, be moved away from the construction box 10 laterally. As shown, the auxiliary frame 20 with the particulate material fill 18 containing the component 16, received therein, may, for example, be moved to a position vertically above the particulate material collecting device 30. Optionally, the porous, plate-shaped structure 15 may be locked to the auxiliary frame. This is, however, not mandatory, and the porous, plate-shaped structure 15 may, for example, be supported by the particulate material collecting device 30, for example by the porous particulate material discharge structure 32 thereof.

As suggested by FIG. 1b, particulate material may already be discharged downward from the auxiliary frame 20 through the porous, plate-shaped structure 15 into the particulate material collecting device 30 during the lateral movement of the auxiliary frame 20. In the second position of the auxiliary frame 20 shown in FIG. 3b, further particulate material may be discharged downward from the auxiliary frame 20 through the porous, plate-shaped structure 15 into the particulate material collecting device 30. Optionally, the component 16 may additionally be blown off/clear by means of the blowing device 36.

Consequently, the component 16 is at least in part unpacked from the particulate material fill 18.

Eventually, the unpacked component 16 is removed from the auxiliary frame 20. This may, for example, be done by means of the optional component transfer station 40.

Figure 4A:
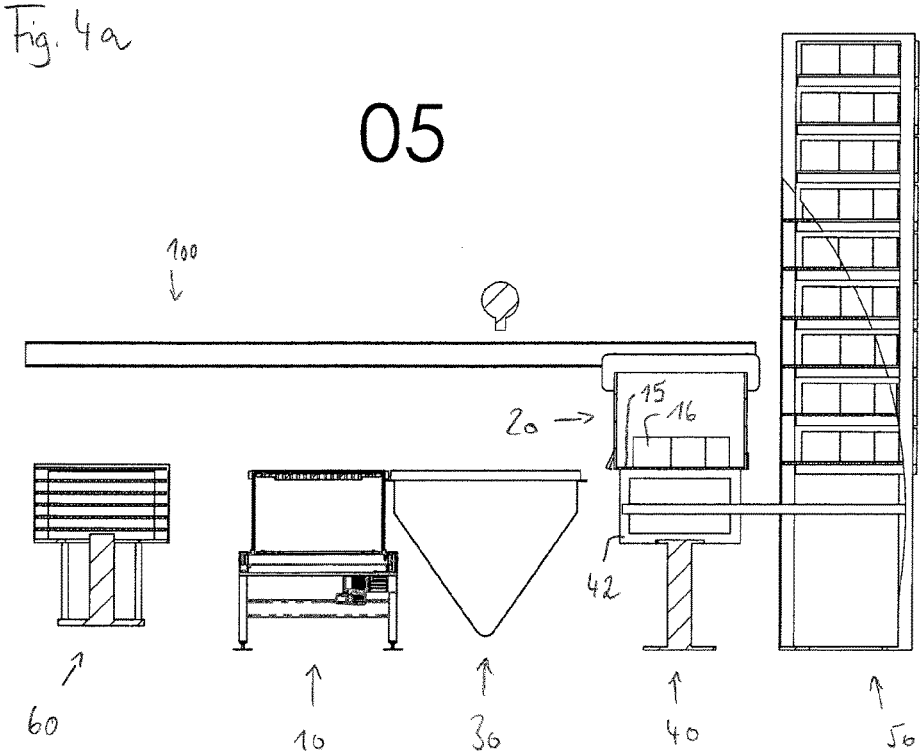
Figure 4B:
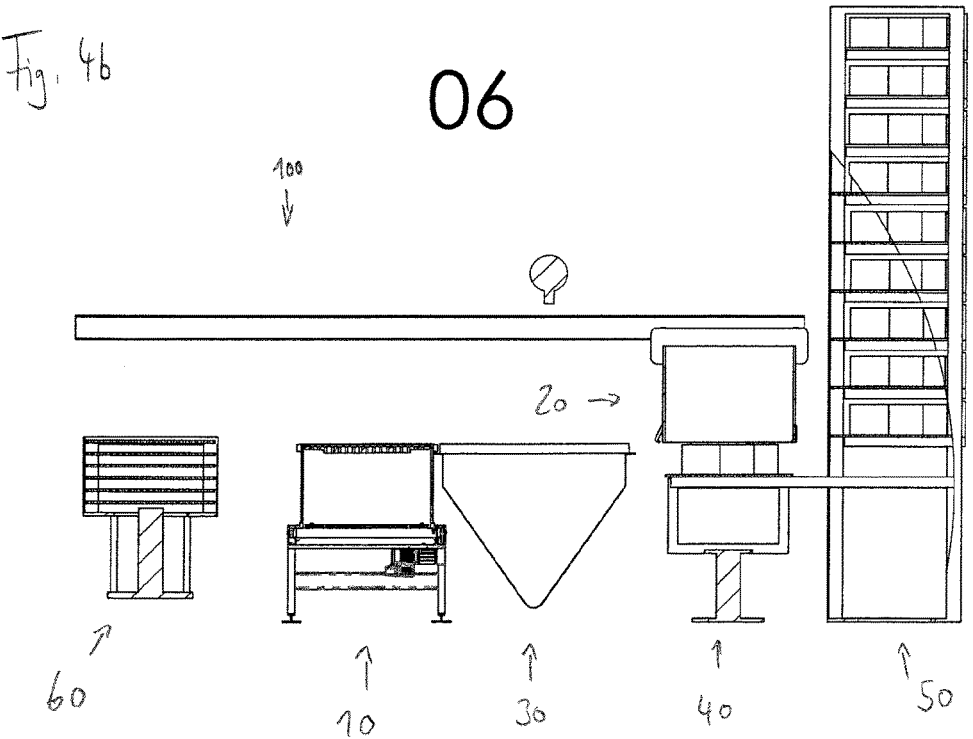

As suggested by FIGS. 4a and 4b, the at least partially unpacked component 16 may, for example, be moved from the particulate material collecting device 30 to the component transfer station 40 together with the porous, plate-shaped structure 15 and the auxiliary frame 20 for this purpose, where the component 16 and the porous, plate-shaped structure 15 are separated from the auxiliary frame 20.

For this purpose, the deposit structure 42 may, for example, be displaced to the level of the particulate material collecting device 30 (see FIG. 4a), and the at least partially unpacked component 16 may then be moved from the particulate material collecting device 30 to the component transfer station 40 together with the porous, plate-shaped structure 15 and the auxiliary frame 20. Then, as suggested by FIG. 4b, the deposit structure 42 may be lowered, so that the auxiliary frame 20 is free and the component 16 and the porous, plate-shaped structure 15 are separated from the auxiliary frame 20.

Figure 5A:
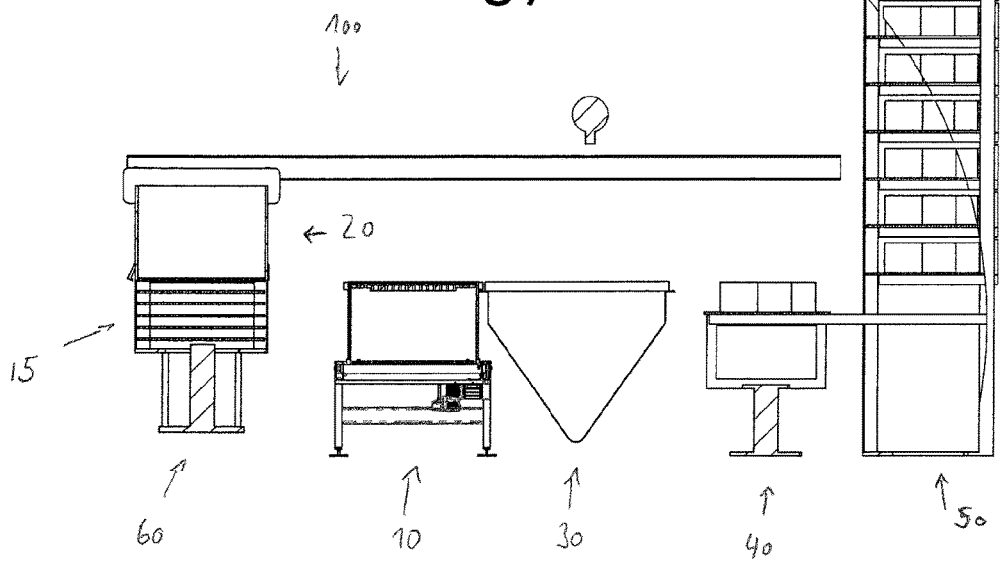

As shown by FIG. 5a, the auxiliary frame 20 may optionally be displaced to its fourth position to seize a porous, plate-shaped structure 15.

Figure 5B:
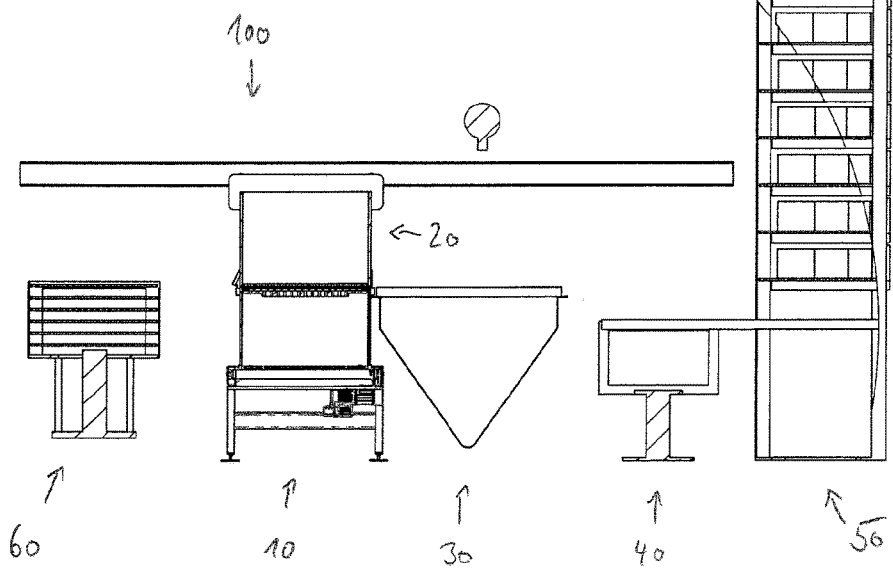

As shown by FIG. 5b, the auxiliary frame 20 may then be moved to the first position again to load the porous, plate-shaped structure 15 to the construction box 10.

As further illustrated by FIGS. 5a and 5b, the component 16 may be supplied from the component transfer station 40, for example, to the component stock 50, for example together with the porous, plate-shaped structure 15.

One or more or all of the above-described process steps may take place in an automated manner.

Using the above-described method, it is thus possible to unpack one or more components easily, reliably and quickly, namely using an existing/common construction box, i.e., without having to retrofit or rebuild the construction box, for example its construction platform.

FIGS. 6 to 13 illustrate an unpacking device and an unpacking method according to a second embodiment of the invention.

As far as possible, features already described shall not be described again, and mainly the differences with respect to the unpacking device and the unpacking method according to the first embodiment of the invention shall be described.

Although certain elements of the first embodiment are not shown in FIGS. 6 to 13, such as the conveying system 19, the guiding structure 24 of the auxiliary frame 20, the cleaning device 26, the blowing device 36 and the shelf 52, it should be understood that these elements may analogously be included in this embodiment as well.

One difference with respect to the first embodiment is that, according to the second embodiment, the construction box 10 is not provided with a porous, plate-shaped structure 15 prior to the construction process, so that no porous, plate-shaped structure 15 will be arranged between the fill 18 and the construction platform 14 after manufacture of the at least one component (here, by way of example three).

Instead, for example an "external" porous, plate-shaped structure 15' may be used according to this embodiment, above which the auxiliary frame 20 is arranged in the course of the process with the particulate material fill 18 containing the component 16 received therein, or rather above which the auxiliary frame 20 is moved relatively.

The "external" porous, plate-shaped structure 15' may, for example, be arranged laterally next to the construction box 10 substantially on the same level as the upper edge area thereof. In this respect, for example, the auxiliary frame 20 may be moved laterally to a position vertically above the porous, plate-shaped structure 15' (see FIG. 9) upon transfer of the particulate material fill 18.

Figure 6:
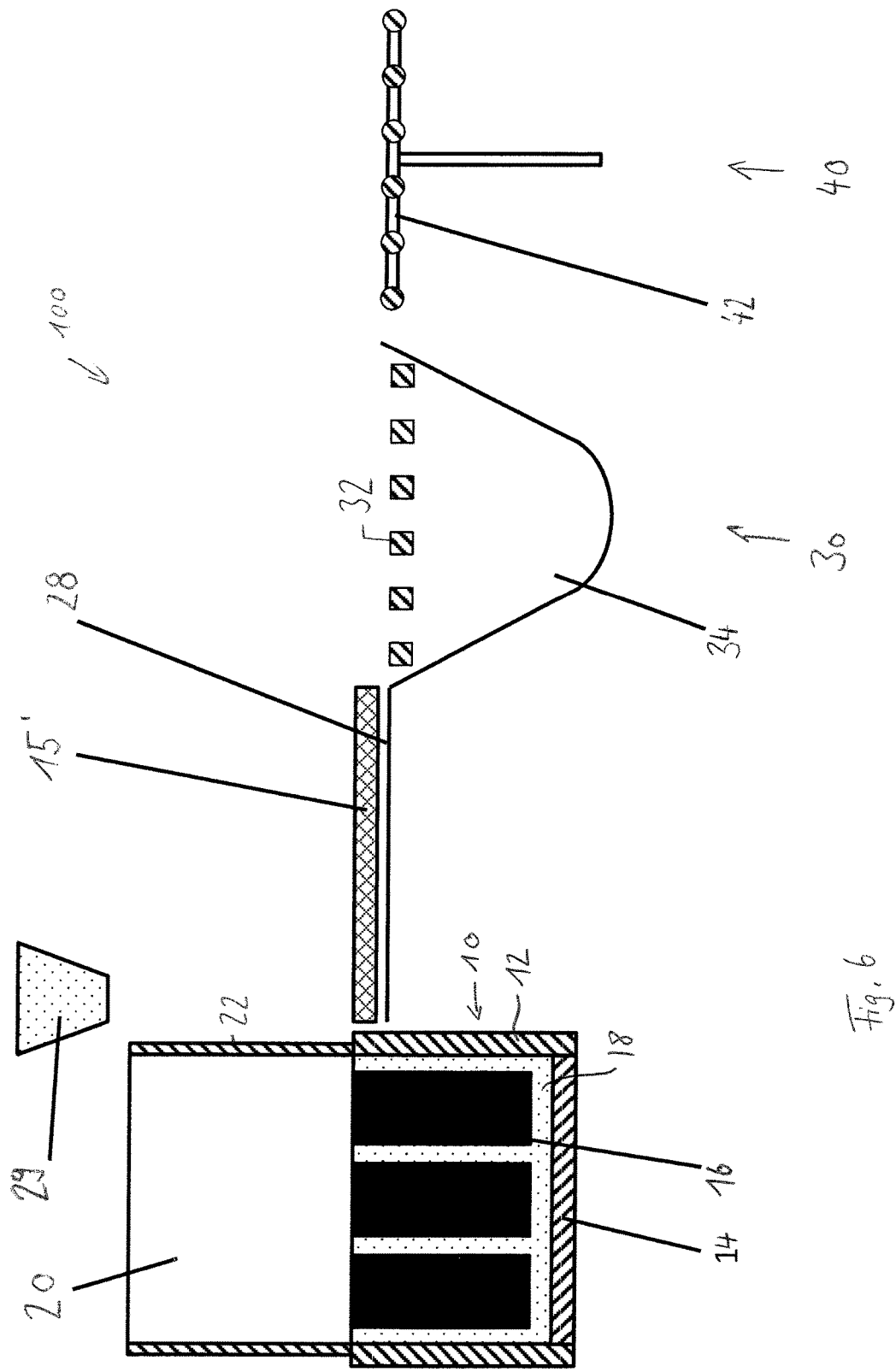
FIGS. 6 to 13 show a device and a method for unpacking a component manufactured by means of a generative manufacturing process from a particulate material fill of unconsolidated particulate material according to a second embodiment of the invention.
Figure 8:
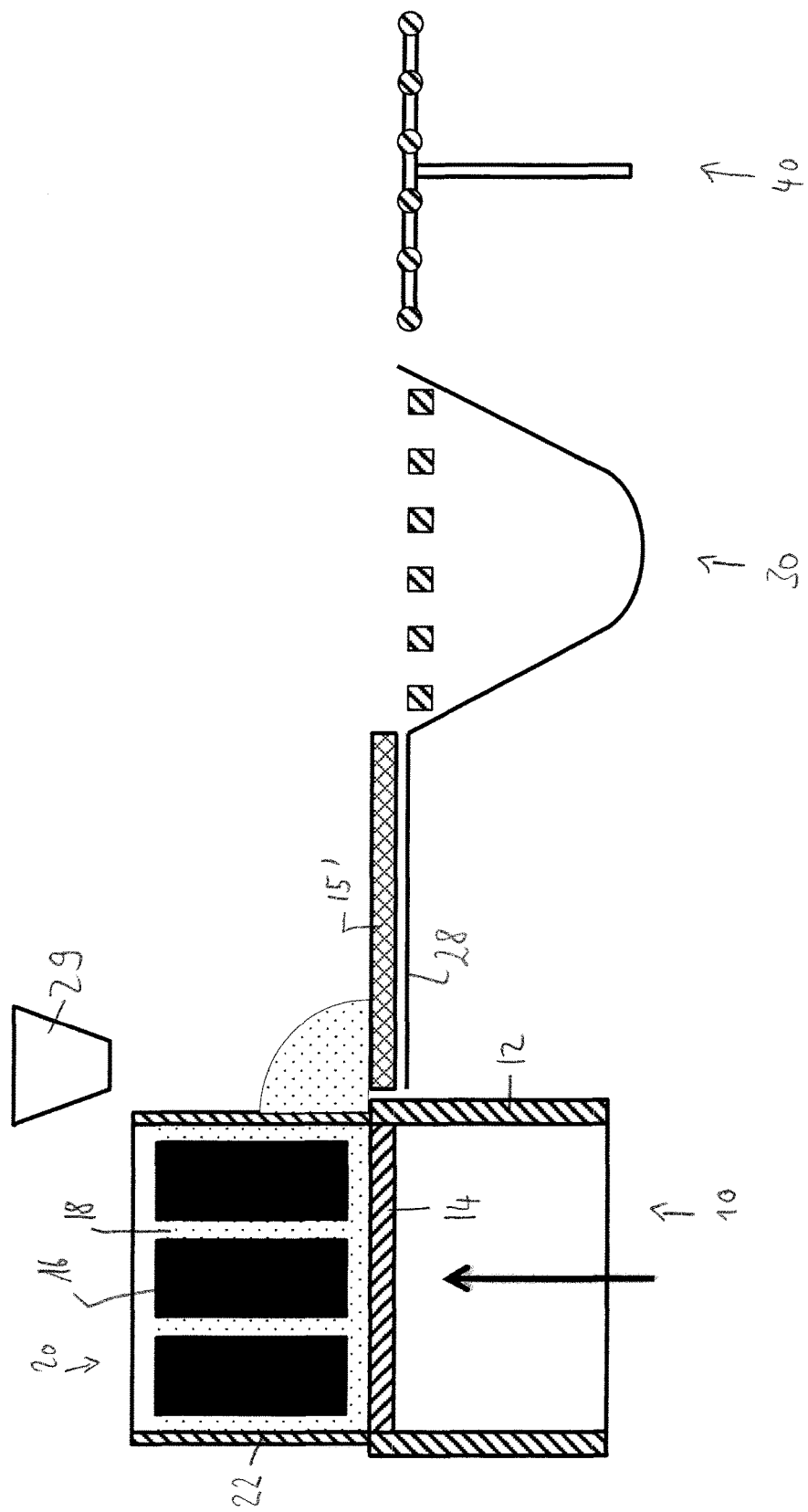
Figure 9:
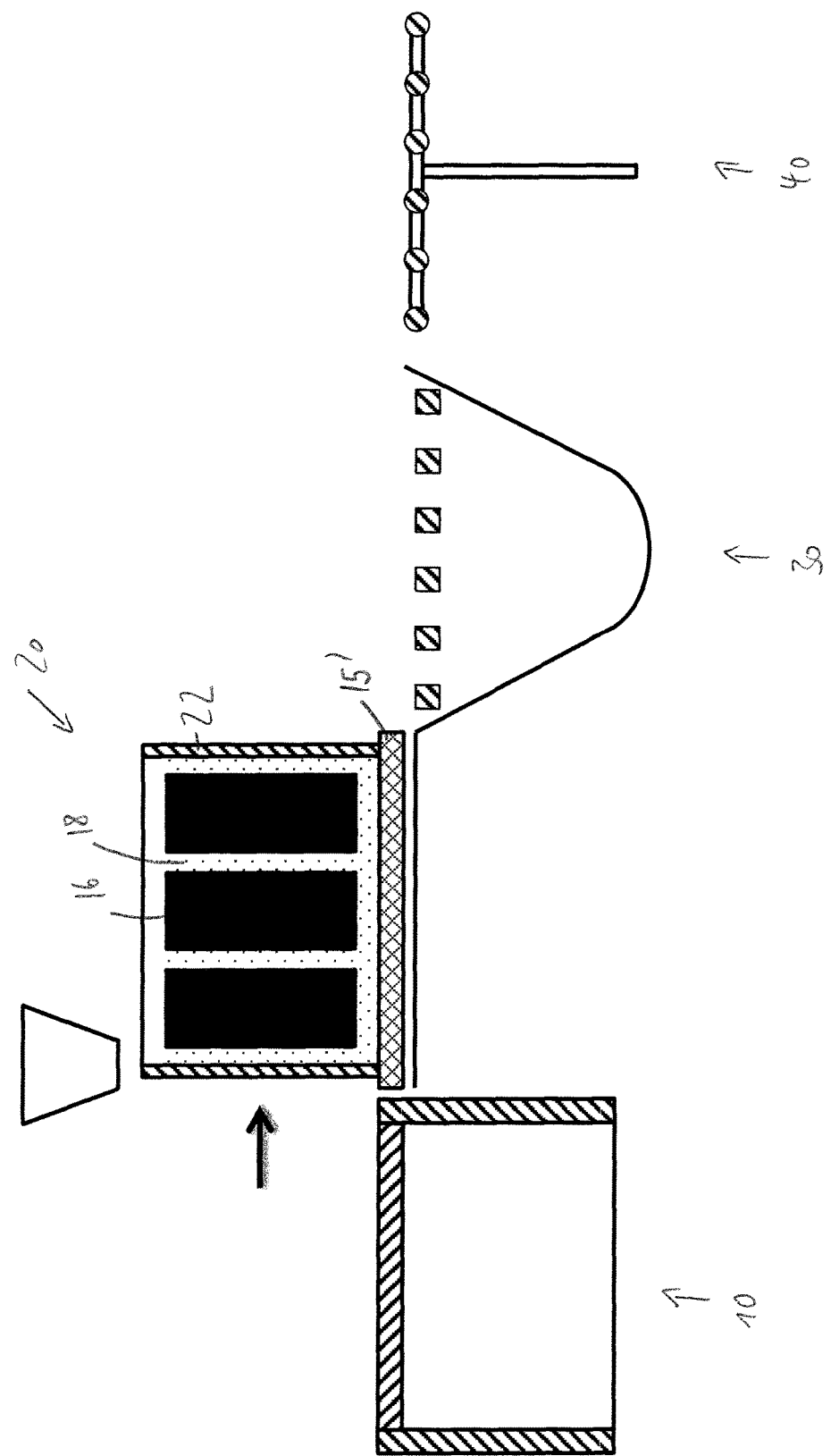
Figure 11:
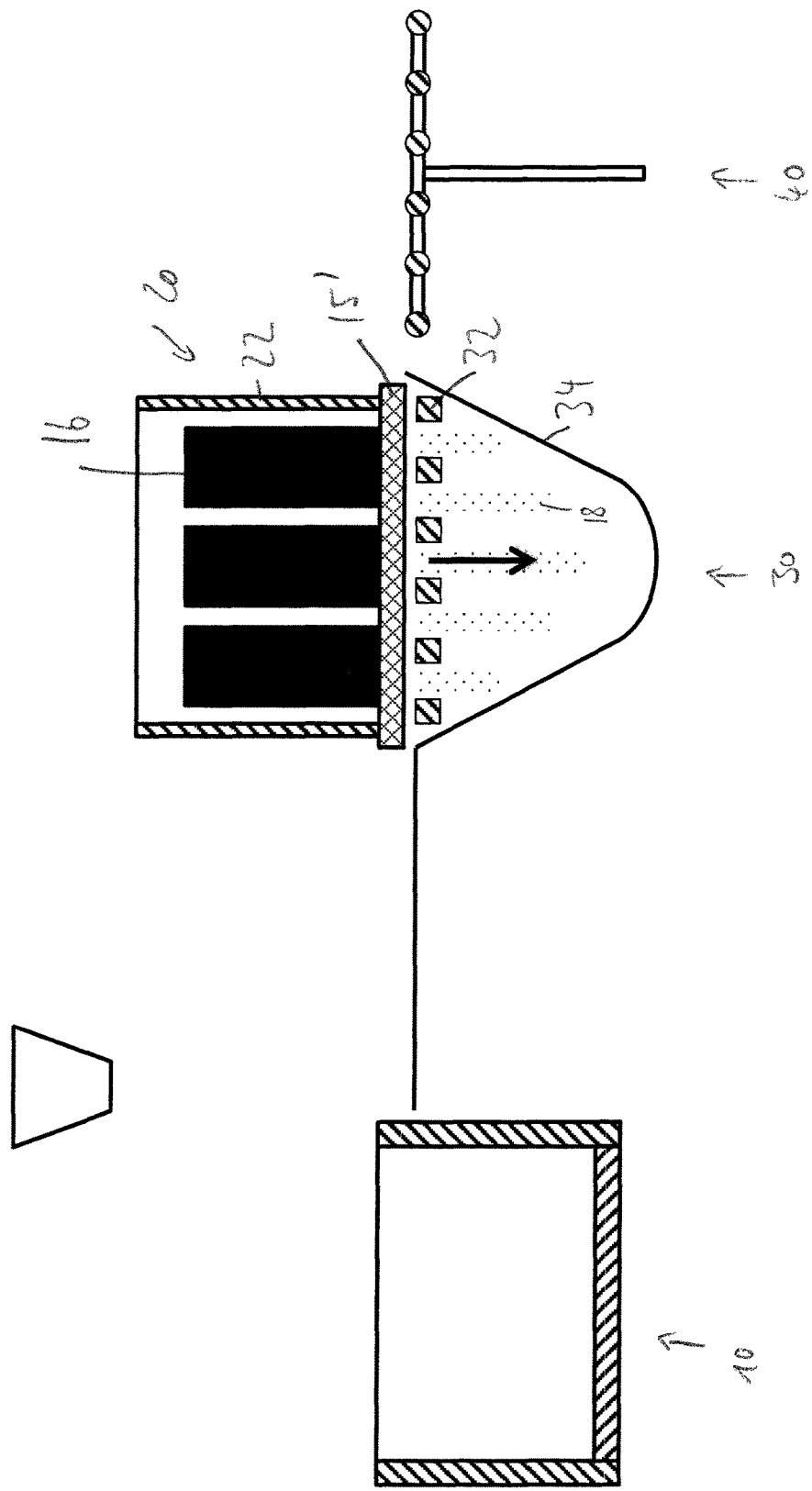
Figure 13:
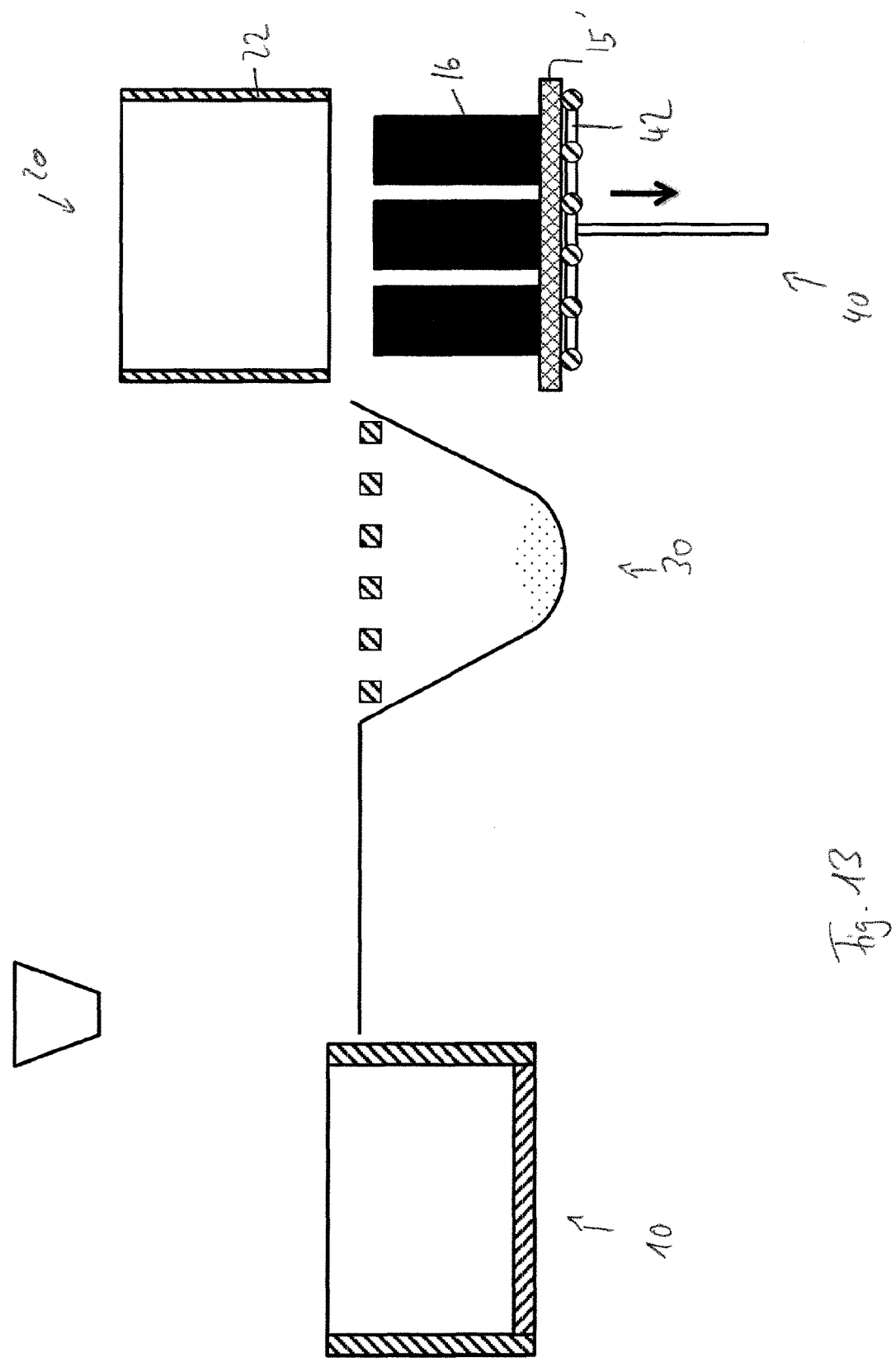

In the unpacking process according to the second embodiment, first the auxiliary frame 20 is arranged vertically above the vertical circumferential wall structure 12 of the construction box 10 with its vertical circumferential wall structure 22, similarly to the first embodiment, as shown in FIG. 6, and then, as shown in FIG. 8, the construction platform 14 is moved upward, so that the particulate material fill 18 containing the component 16 is transferred from the construction box 10 to the auxiliary frame 20 and received in the latter; then, as shown in FIG. 9, the auxiliary frame 20 with the particulate material fill 18 containing the component 16 and the construction box 10 are moved apart, so that the construction box 10 is free for a new construction job, and then, as shown in FIG. 11, the component is at least partially unpacked from the particulate material fill, and eventually, as shown in FIG. 13, the component 16 is removed from the auxiliary frame 20.

According to the second embodiment and as already mentioned and shown in FIG. 9, the auxiliary frame 20 may, for example, be arranged vertically above an (external) porous, plate-shaped structure 15' with the particulate material fill 19 containing the component 16 received therein.

Figure 10:
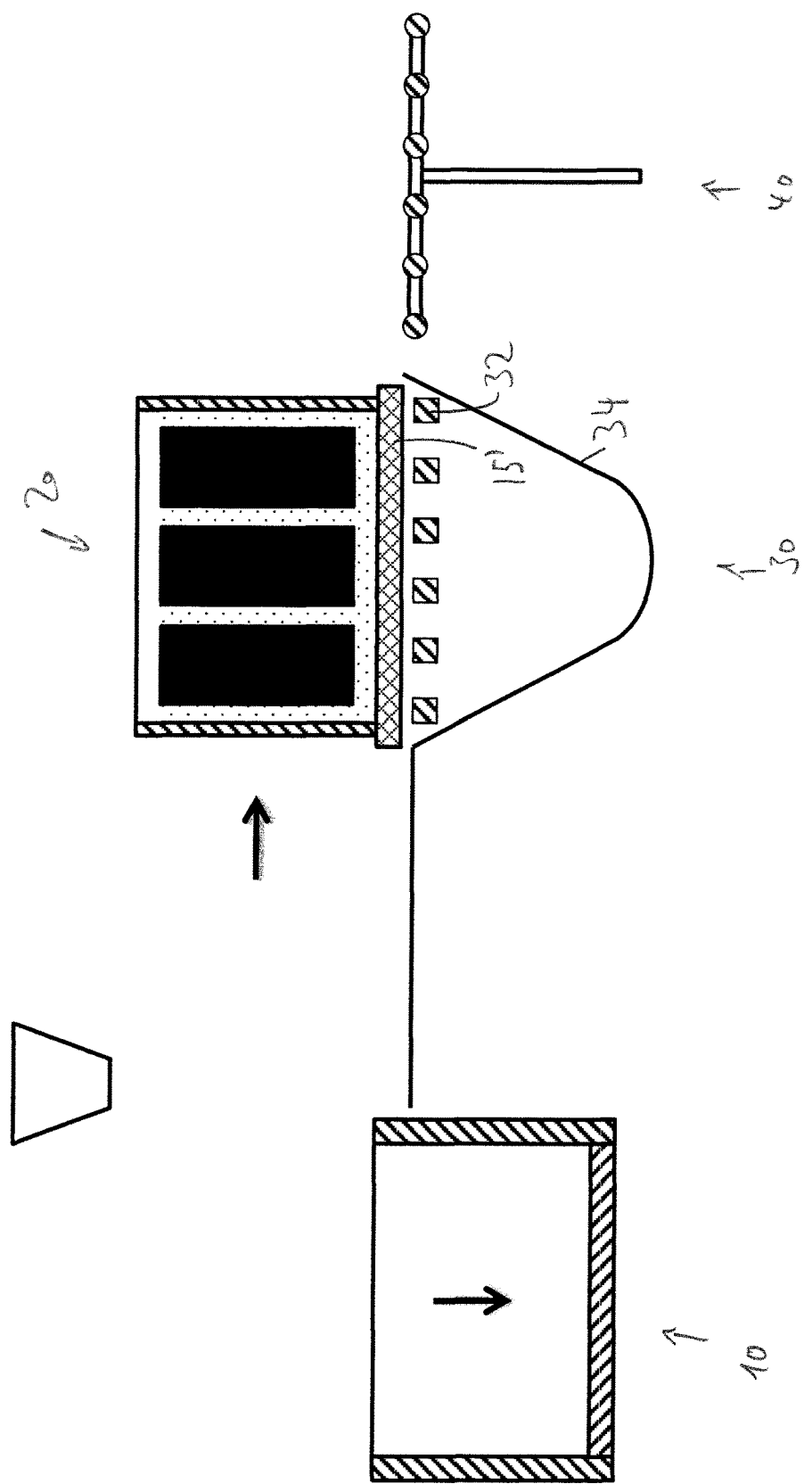

After moving the auxiliary frame 20 with the particulate material fill 18 containing the component 16 received therein over the porous, plate-shaped structure 15', for example the porous, plate-shaped structure 15' and the auxiliary frame 20 may be moved together over the particulate material collecting device 30, as shown in FIG. 10. In this respect, the at least one component 16 may be unpacked at least in part, by particulate material trickling downward from the auxiliary frame 20 through the porous, plate-shaped structure 15' into the particulate material collecting device 30. See FIG. 11.

Hereafter, the at least one unpacked component 16 is removed from the auxiliary frame 20. This may, for example, be done by means of the optional component transfer station 40 (alternatively, the component 16 may, for example, be removed through the upper opening of the auxiliary frame).

Figure 12:
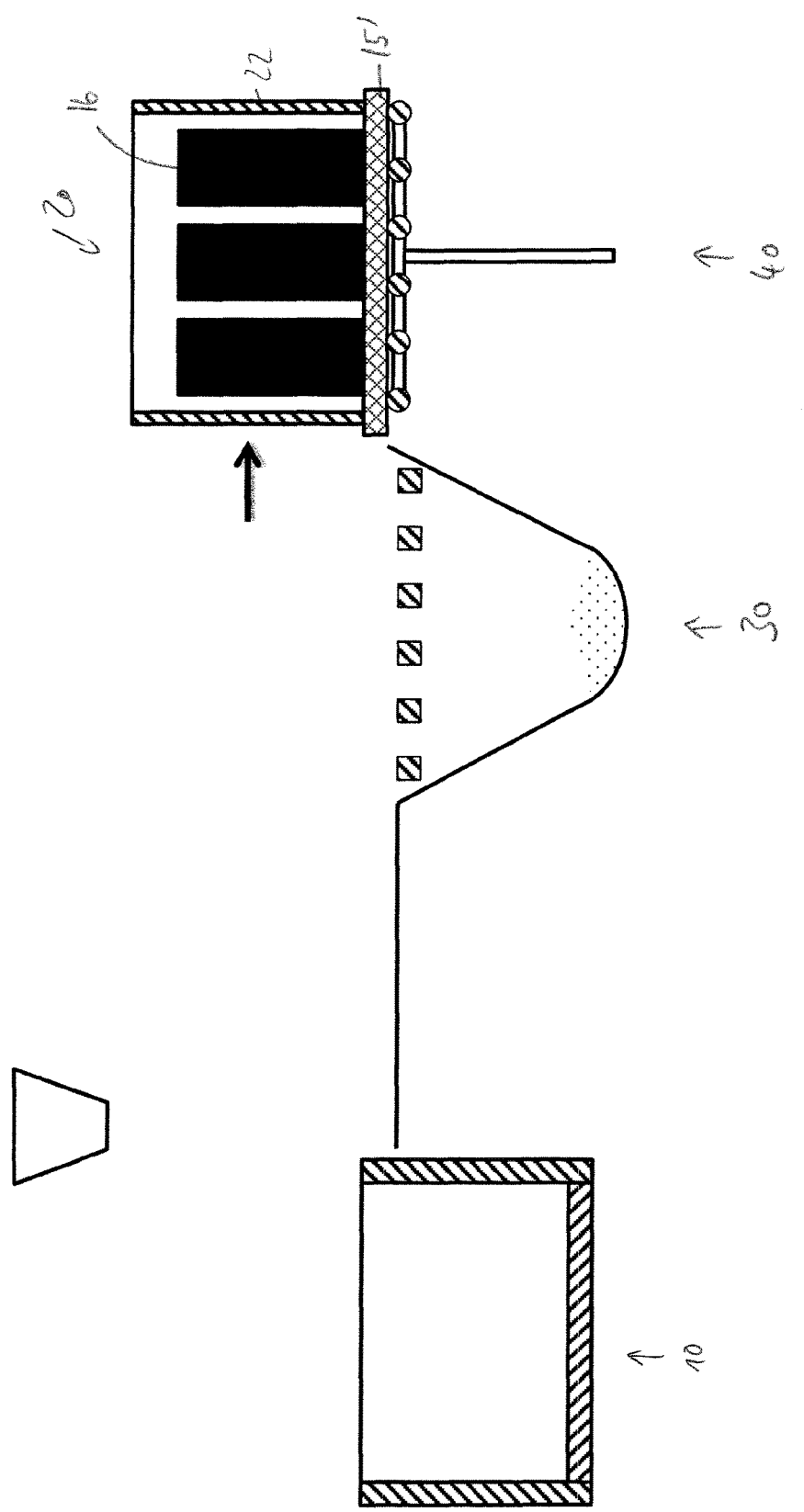

As suggested by FIGS. 12 and 13, the at least partially unpacked component 16 may for this purpose be moved from the particulate material collecting device 30 to the component transfer station 40 together with the porous, plate-shaped structure 15 and the auxiliary frame 20, where the component 16 and the porous, plate-shaped structure 15 are separated from the auxiliary frame 20.

For this purpose, the deposit structure 42 may, for example be arranged/displaced on the same level as the particulate material collecting device 30 (see FIG. 12), and then the at least partially unpacked component 16 may be moved from the particulate material collecting device 30 to the component transfer station 40 together with the porous, plate-shaped structure 15' and the auxiliary frame 20. Then, as suggested by FIG. 13, the deposit structure 42 may be lowered, so that the auxiliary frame 20 is free, or rather the component 16 and the porous, plate-shaped structure 15' are separated from the auxiliary frame 20.

Figure 7:
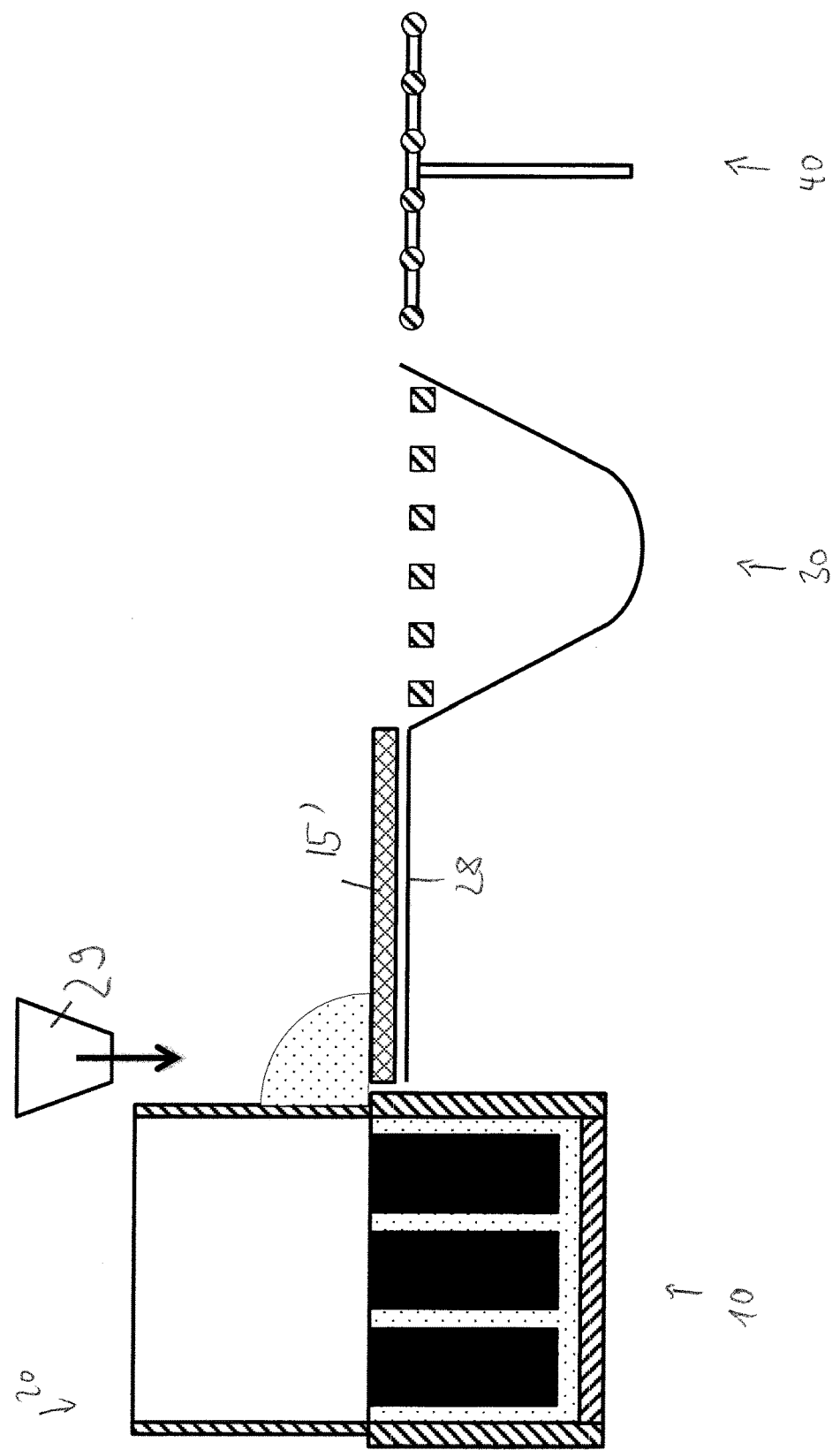

In order to reduce a discharge of particulate material from the auxiliary frame 20 through the porous, plate-shaped structure 15' during the lateral movement of the auxiliary frame 20 to the position vertically above the porous, plate-shaped structure 15', shown in FIG. 9, the openings of the porous, plate-shaped structure 15' may, for example, be filled with particulate material and/or may be covered. This is shown in FIGS. 6 to 9. This allows to avoid that, during the relative movement to the porous, plate-shaped structure 15', the at least one component rubs against the latter and is thereby damaged. As shown by FIGS. 6 and 7, particulate material, for example sand, may be put on the porous, plate-shaped structure 15' from the particulate material vessel 29 and may be spread over the same, for example by the auxiliary frame pushing a heap of particulate material forward, so that the openings of the porous, plate-shaped structure 15' are filled with particulate material. By way of example, a plate structure 28 is arranged under the porous, plate-shaped structure 15' in this regard, by which the openings of the porous, plate-shaped structure 15' are covered to prevent particulate material from trickling downward during the relative movement.

The porous, plate-shaped structure 15' may, for example, be driven by a horizontal linear actuator for its journey from the position shown in FIG. 7 to the position shown in FIG. 12. In the position shown in FIG. 12, the porous, plate-shaped structure 15' may, for example, be uncoupled from the drive mechanism, to allow the porous, plate-shaped structure 15' to be lowered together with the component 16.

FIGS. 14 to 21 illustrate an unpacking device and an unpacking method according to a third embodiment of the invention.

As far as possible, features already described shall not be described again, and mainly the differences with respect to the unpacking device and the unpacking method according to the first and second embodiments of the invention shall be described.

Although certain elements are not shown in FIGS. 14 to 21, such as the conveying system 19, the guiding structure 24 of the auxiliary frame 20, the cleaning device 26, the blowing device 36 and the rack 52 of the first embodiment, it should be understood that these elements may analogously be included in the third embodiment as well.

Just like in the second embodiment, the third embodiment also uses an "external" porous, plate-shaped structure 15' above which the auxiliary frame 20 is arranged in the course of the process with the particulate material fill 18 containing the component 16 received therein, or above which the auxiliary frame 20 is moved relatively.

Figure 14:
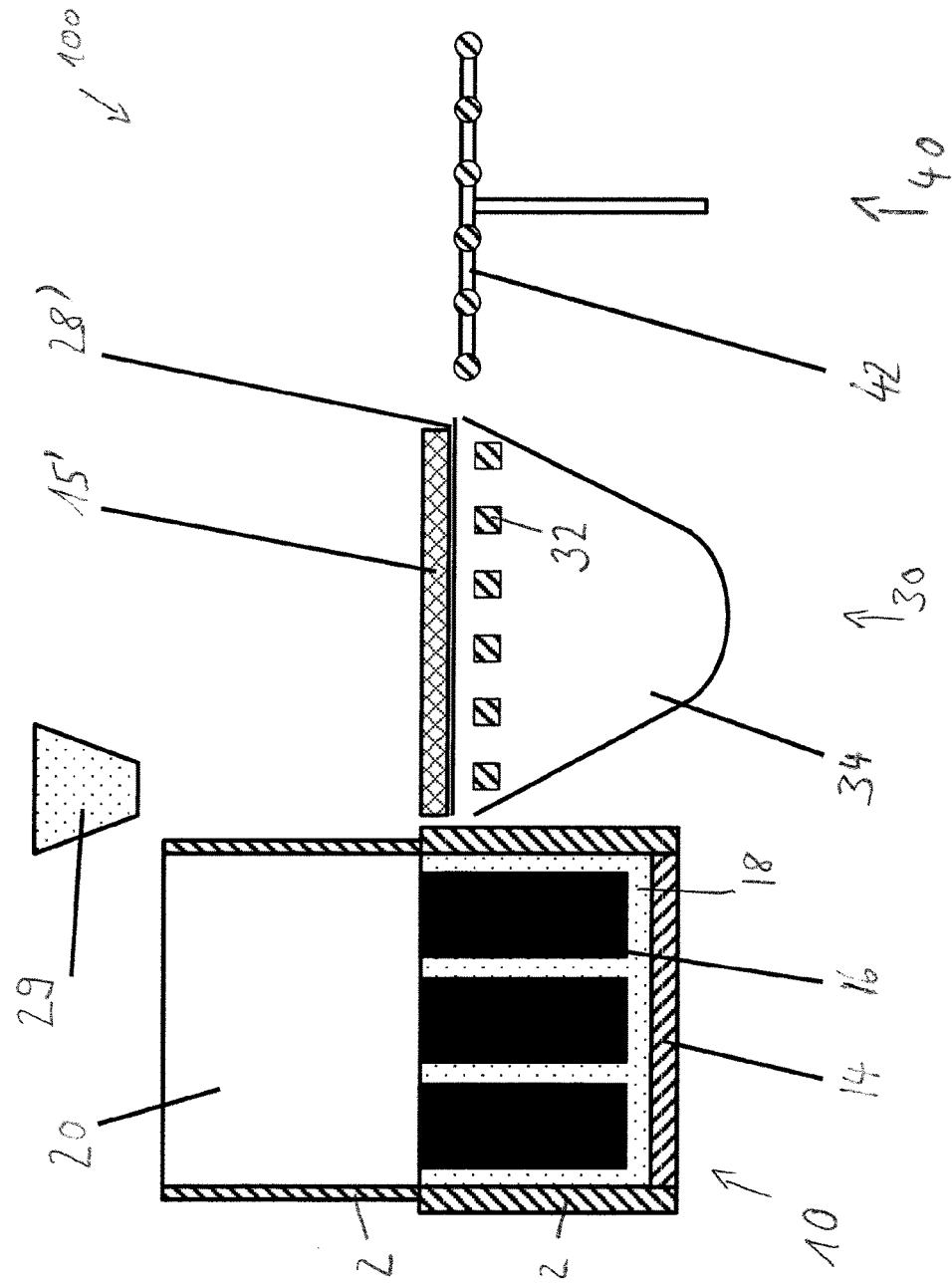
FIGS. 14 to 21 show a device and a method for unpacking a component manufactured by means of a generative manufacturing process from a particulate material fill of unconsolidated particulate material according to a third embodiment of the invention.
Figure 15:
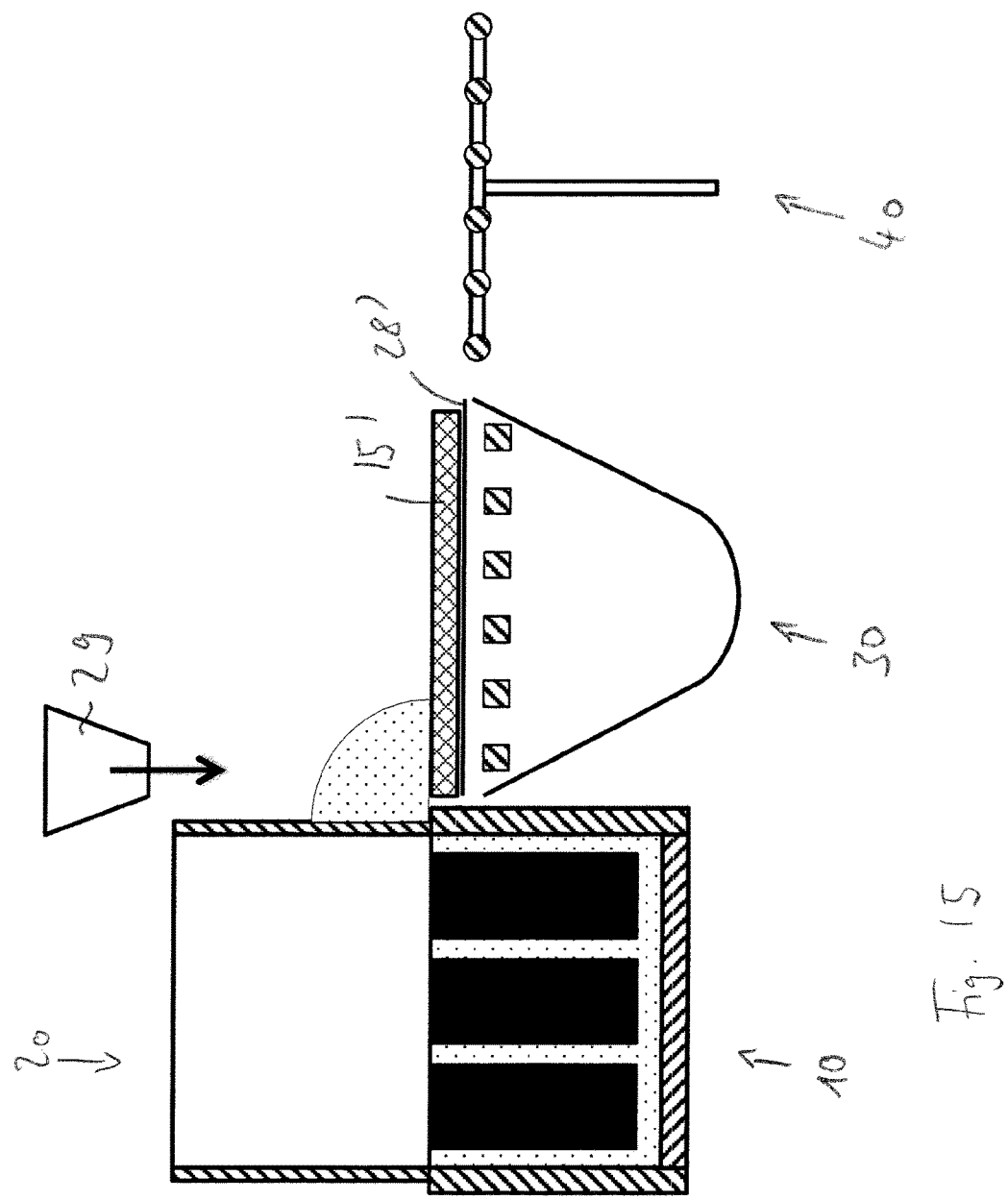
Figure 16:
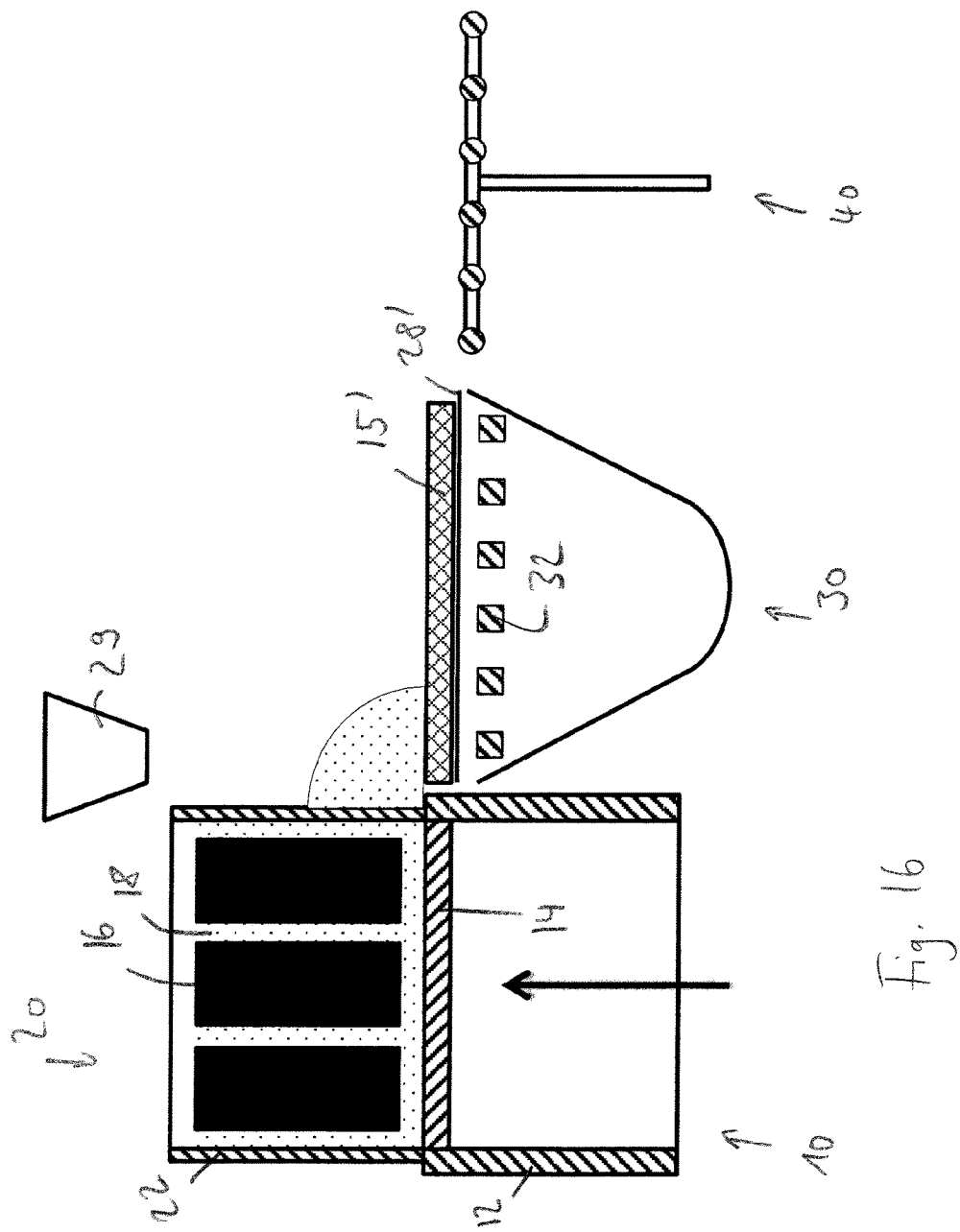
Figure 17:
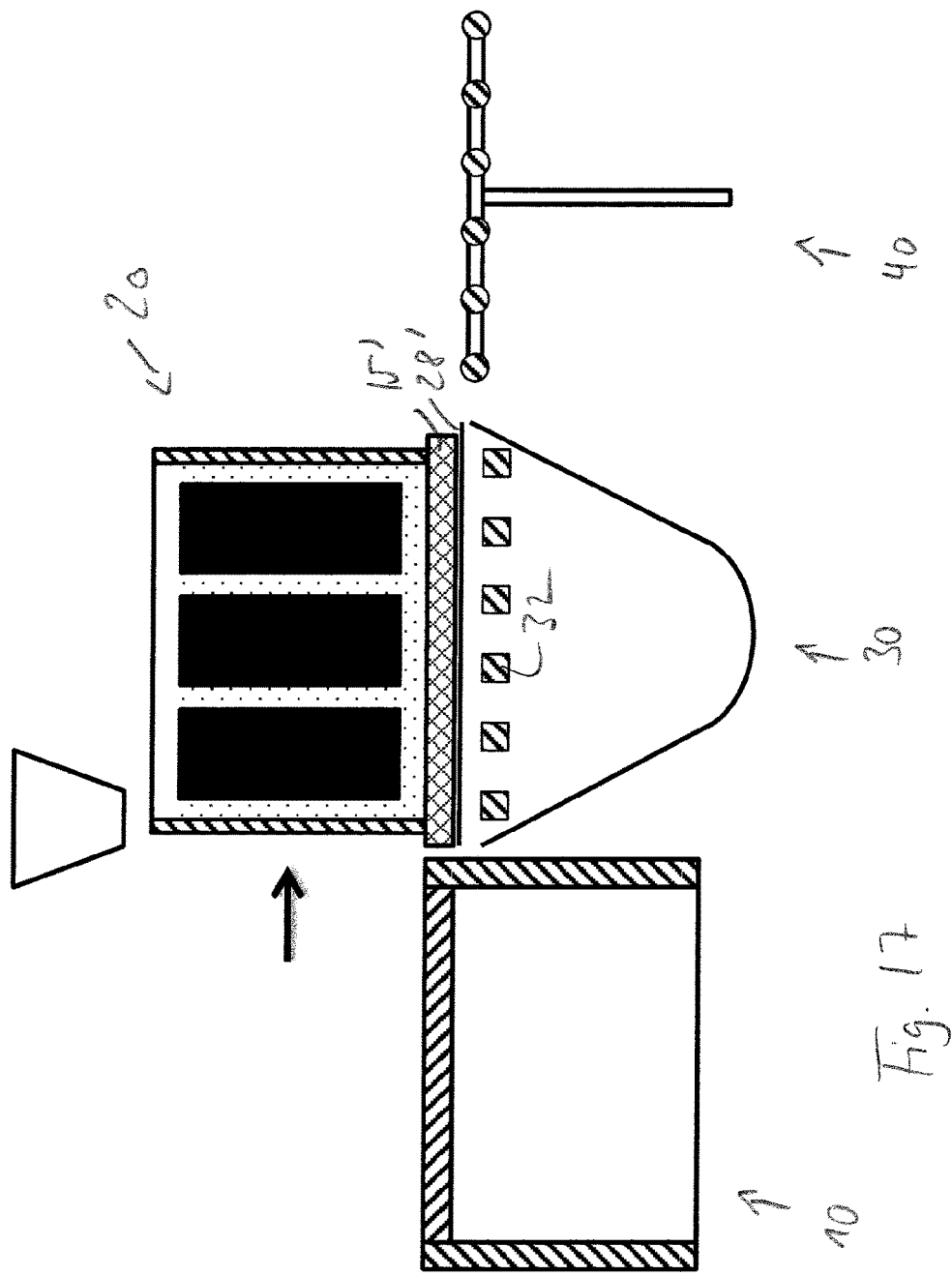
Figure 19:
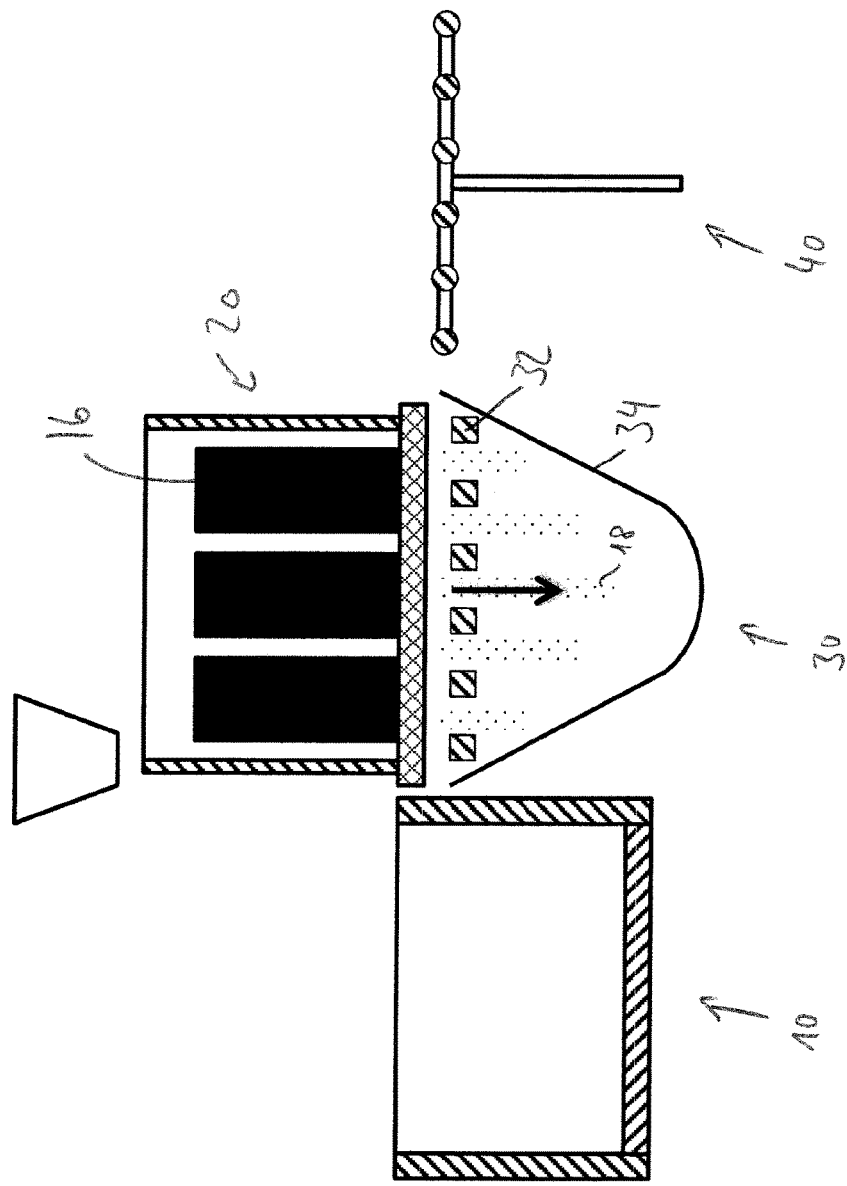
Figure 21:
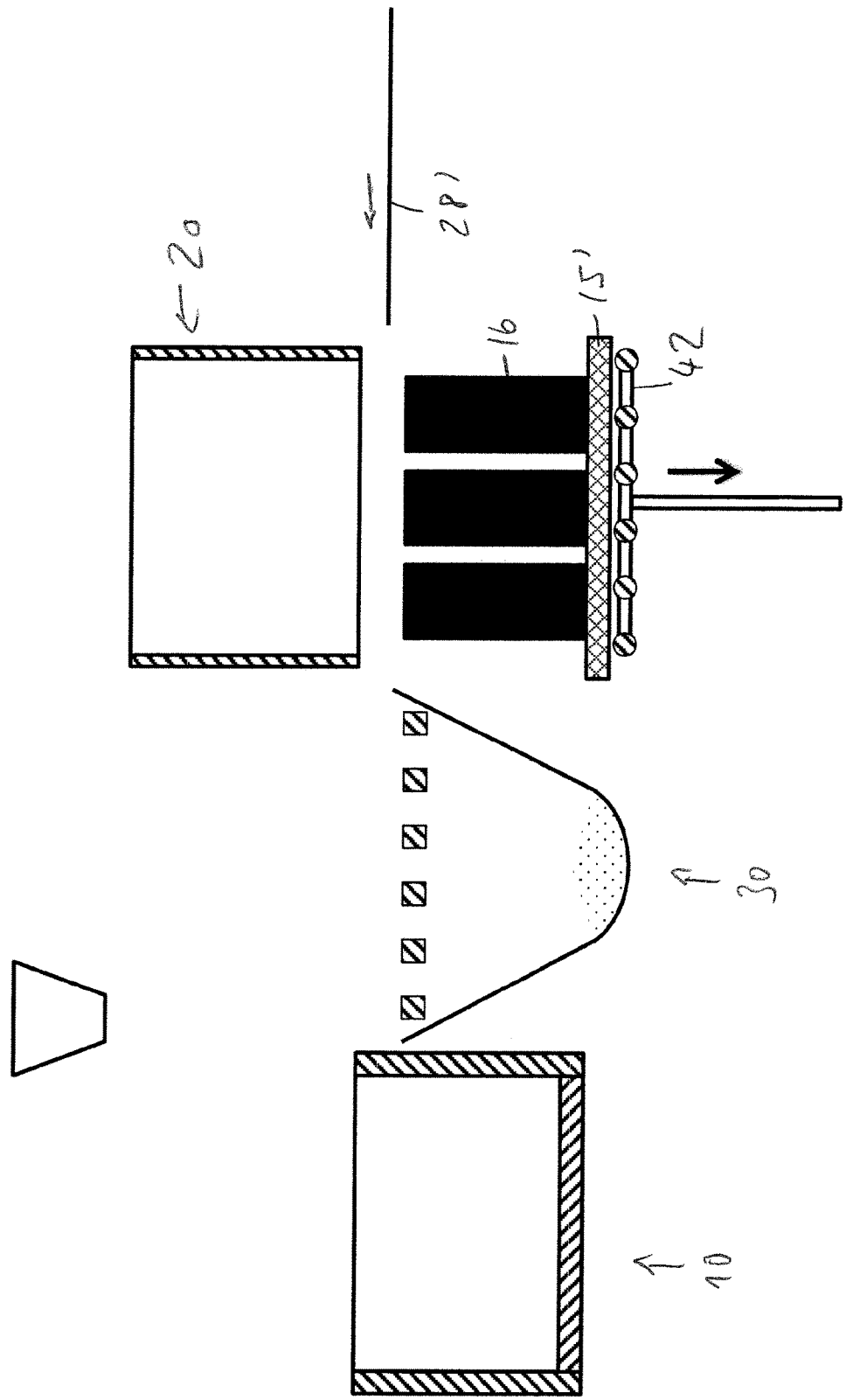

In the unpacking process according to the third embodiment, similarly to the first and second embodiments, first the auxiliary frame 20 is arranged vertically above the vertical circumferential wall structure 12 of the construction box 10 with its vertical circumferential wall structure 22, as shown in FIG. 14, and then, as shown in FIG. 16, the construction platform 14 is moved upward, so that the particulate material fill 18 containing the component 16 is transferred from the construction box 10 to the auxiliary frame 20 and received in the latter; then, as shown in FIG. 17, the auxiliary frame 20 with the particulate material fill 18 containing the component 16 received therein, and the construction box 10 are moved apart, so that the construction box 10 is free for a new construction job, and then, as shown in FIG. 19, the component 16 is at least partially unpacked from the particulate material fill 18, and eventually, as shown in FIG. 21, the component 16 is removed from the auxiliary frame 20.

Other than in the second embodiment, the porous, plate-shaped structure 15' according to the third embodiment is already arranged above the particulate material collecting device 30.

Figure 18:
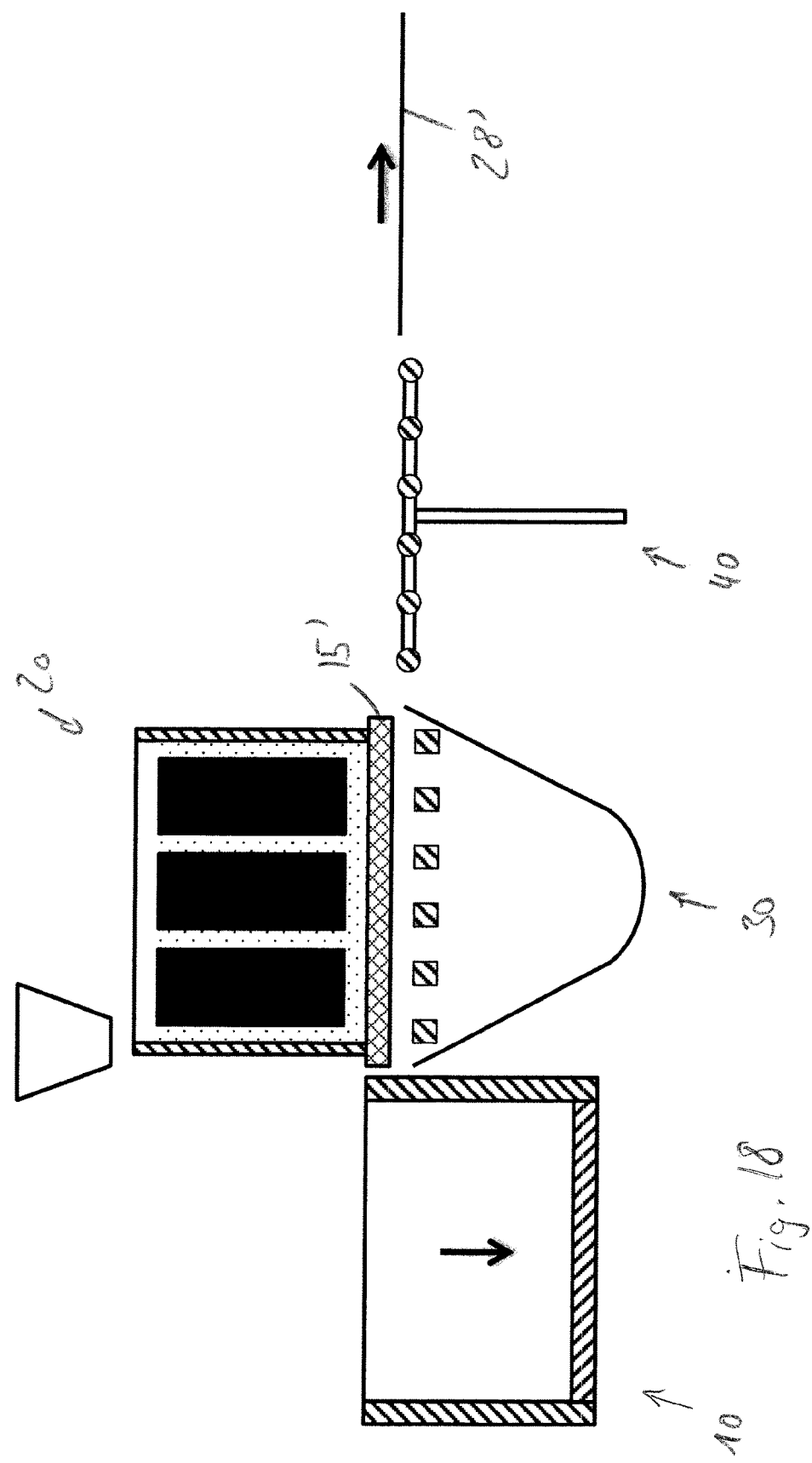

Moreover, a movable pusher plate 28' is provided in the third embodiment, which covers the openings of the porous, plate-shaped structure 15' during a lateral relative movement between the auxiliary frame 20 and the porous, plate-shaped structure 15'. See, for example, FIG. 17. As shown in FIG. 18, the openings of the porous, plate-shaped structure 15' may then be exposed by the pusher plate 28', to allow an at least partial unpacking of the component 16; see FIG. 19. Later, the pusher plate 28' may be moved back to its starting position; see FIG. 21.

Hereafter, the at least one unpacked component 16 is removed from the auxiliary frame 20. This may, for example, be done by means of the optional component transfer station 40.

Figure 20:
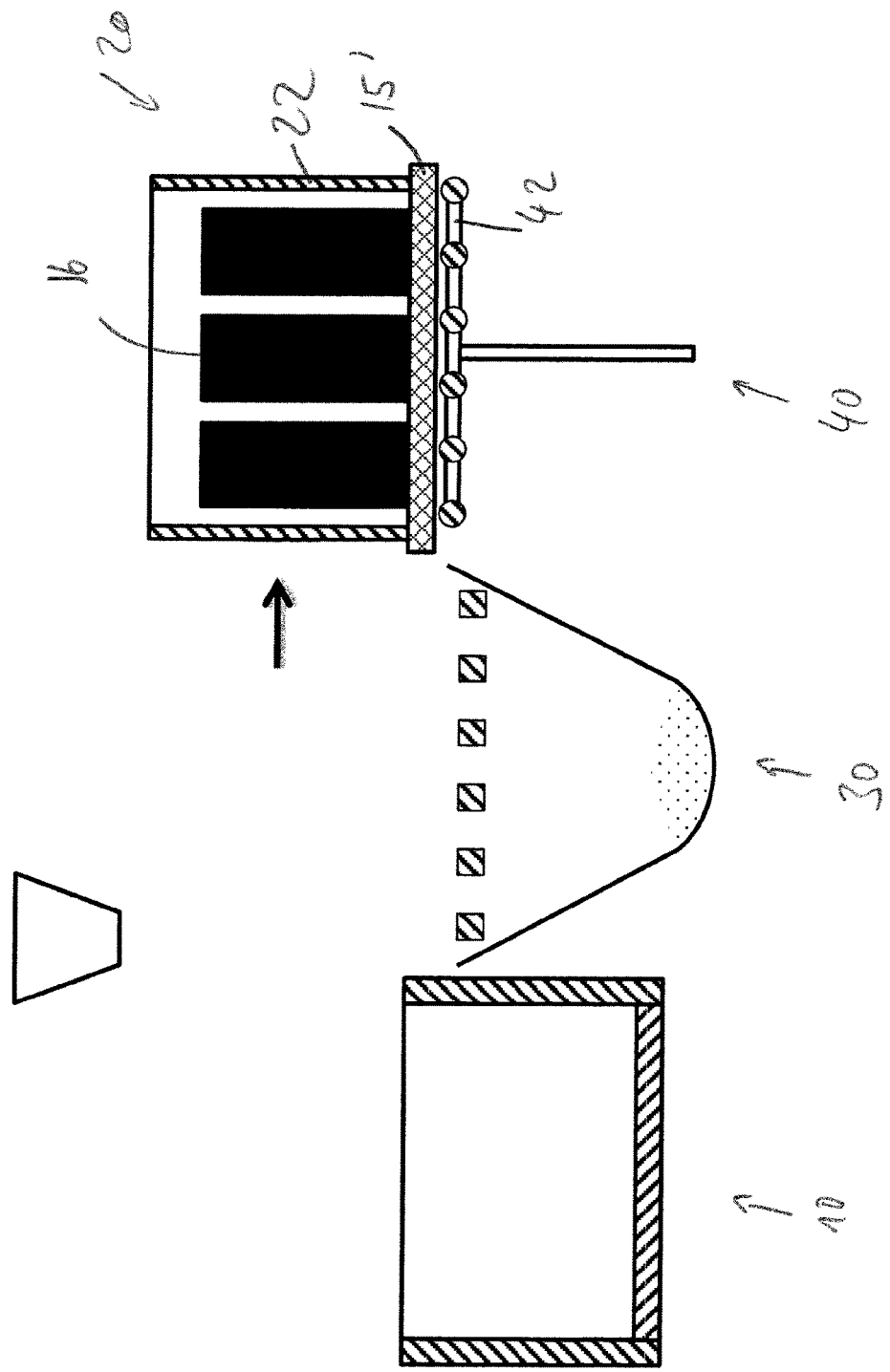

In this regard, the steps suggested by FIGS. 20 and 21 in this context correspond substantially to the steps illustrated in FIGS. 12 and 13.

FIGS. 22 to 28 illustrate an unpacking device and an unpacking method according to a fourth embodiment of the invention.

As far as possible, features already described shall not be described again, and mainly the differences with respect to the unpacking device and the unpacking method according to the first, second and third embodiments of the invention shall be described.

Although certain elements are not shown in FIGS. 22 to 28, such as the conveying system 19, the guiding structure 24 of the auxiliary frame 20, the cleaning device 26, the blowing device 36 and the rack 52 of the first embodiment, it should be understood that these elements may analogously be included in the fourth embodiment as well.

Just like in the second and third embodiments, the fourth embodiment also uses an "external" porous, plate-shaped structure 15', above which the auxiliary frame 20 is arranged in the course of the process with the particulate material fill 18 containing the component 16 received therein, or above which the auxiliary frame 20 is moved relatively.

Figure 22:
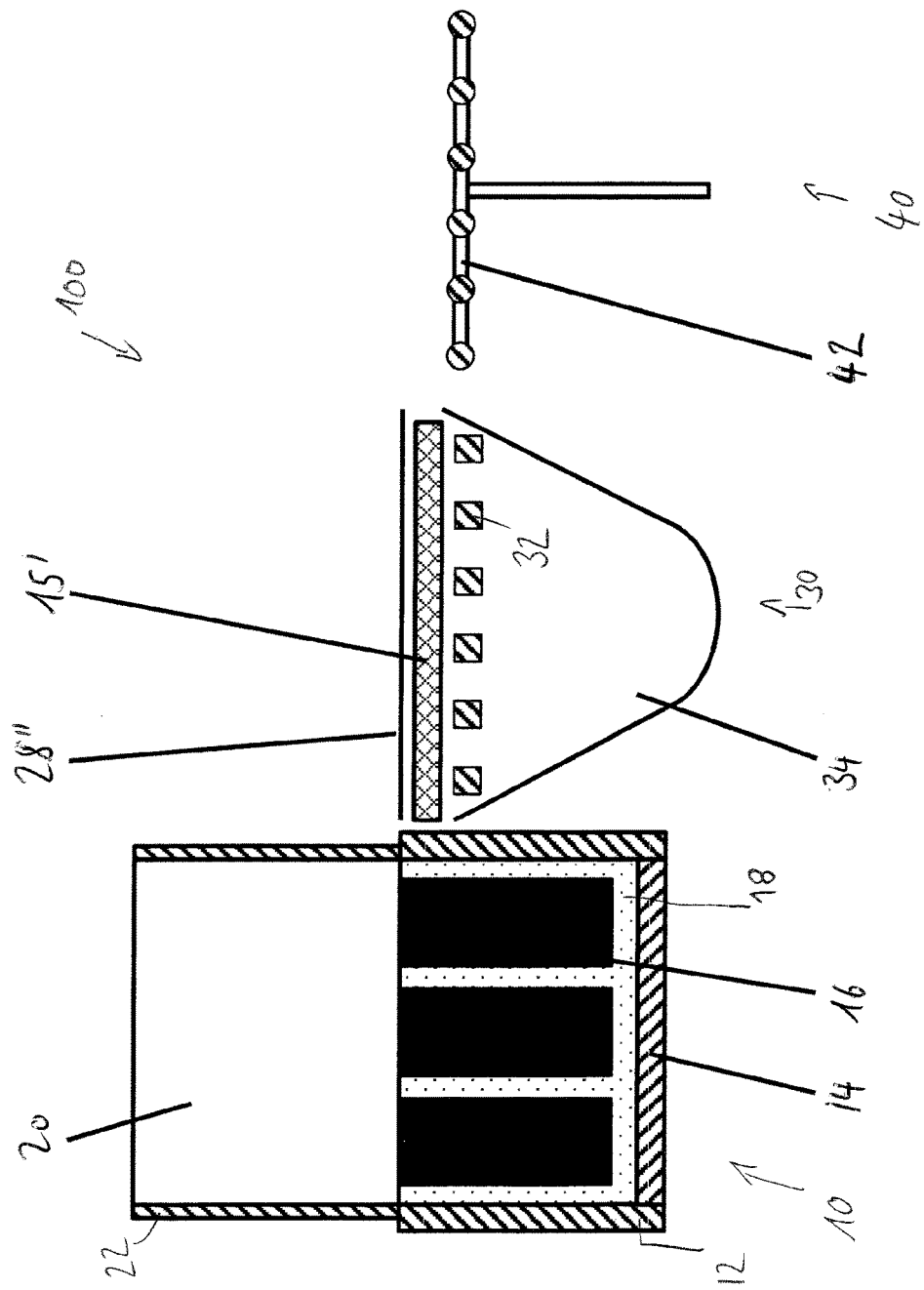
Figure 23:
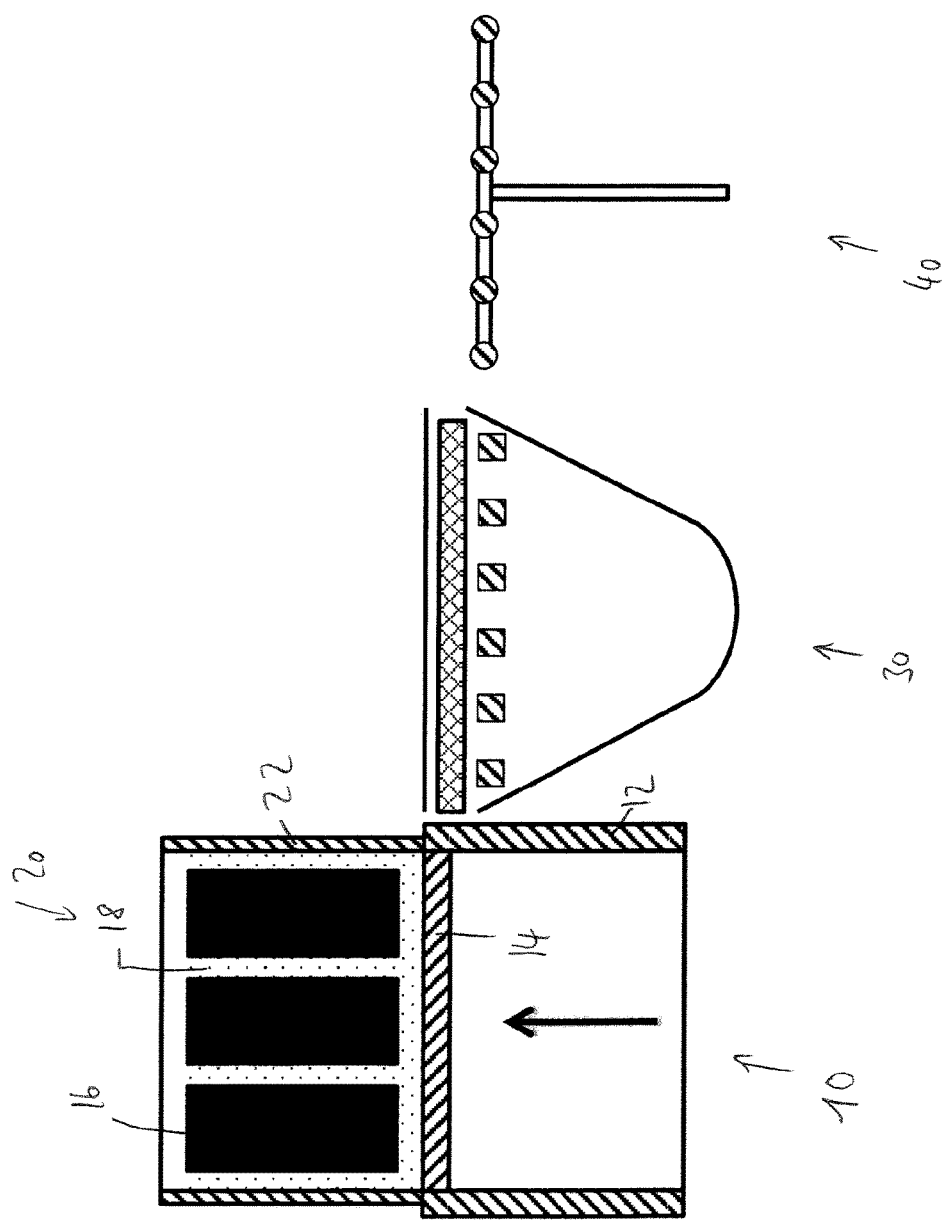
Figure 24:
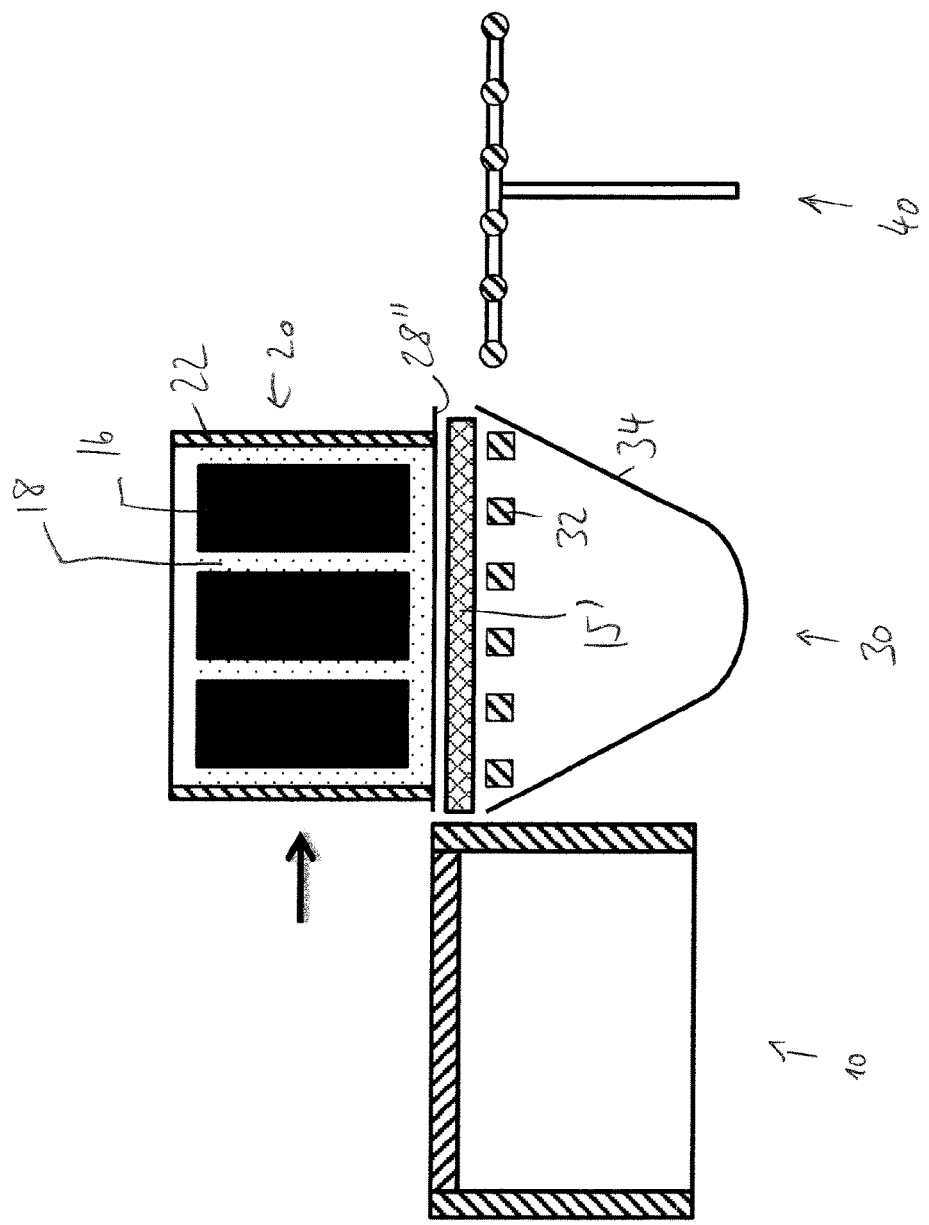

In the unpacking process according to the fourth embodiment, similarly to the first, second and third embodiments, first the auxiliary frame 20 is arranged vertically above the vertical circumferential wall structure 12 of the construction box 10 with its vertical circumferential wall structure 22, as shown in FIG. 22, and then, as shown in FIG. 23, the construction platform 14 is moved upward, so that the particulate material fill 18 containing the component 16 is transferred from the construction box 10 to the auxiliary frame 20 and received in the latter; then, as shown in FIG. 24, the auxiliary frame 20 with the particulate material fill 18 containing the component 16 received therein, and the construction box 10 are moved apart, so that the construction box 10 is free for a new construction job, and then, as shown in FIG. 26, the component 16 is at least partially unpacked from the particulate material fill 18, and eventually, as shown in FIG. 28, the component 16 is removed from the auxiliary frame 20.

Just like in the third embodiment, the porous, plate-shaped structure 15' according to the fourth embodiment is already arranged above the particulate material collecting device 30.

Other than in the third embodiment, the movable pusher plate 28" of the fourth embodiment, which covers the openings of the porous, plate-shaped structure 15' during a lateral relative movement between the auxiliary frame 20 and the porous, plate-shaped structure 15' is arranged above the porous, plate-shaped structure 15'. See, for example, FIGS. 22 to 24. Thus, the fill 18 does at first not rest directly on the porous, plate-shaped structure 15', but first rests on the pusher plate 28". As shown by FIG. 25, the openings of the porous, plate-shaped structure 15' may be exposed by the pusher plate 28", to allow an at least partial unpacking of the component 16; see FIG. 26. Later, the pusher plate 28' may be moved back to its starting position again; see FIG. 28.

Hereafter, the at least one unpacked component 16 is removed from the auxiliary frame 20. This may, for example, be done by means of the optional component transfer station 40.

In this regard, the steps suggested by FIGS. 27 and 28 in this context correspond substantially to the steps illustrated in FIGS. 12 and 13, and 20 and 21, respectively.

According to another embodiment which is not shown, the unpacking method may, for example, be carried out without an (internal or external) porous, plate-shaped structure 15 and 15', respectively. For this purpose, an arrangement may be chosen, which substantially corresponds to that of FIG. 14, the porous, plate-shaped structure 15' and the pusher plate 28' being saved/omitted. In this respect, the auxiliary frame 20 may be moved toward the right over the particulate material collecting device 30 upon transfer of the fill 18 including the component 16 (as suggested by FIGS. 16 and 17, but without the porous, plate-shaped structure 15' and the pusher plate 28'). The porous particulate material discharge structure 32 of the particulate material collecting device 30 may retain the components in this regard, so that these can then be simply removed from the porous particulate material discharge structure 32, for example through the upper opening of the auxiliary frame 20 or after the auxiliary frame 20 has been moved away upward (in this case, the auxiliary frame may, for example, be guided in a different way or may not be guided at all).

According to another embodiment not shown, the auxiliary frame 20 may, for example, be moved laterally over a height-adjustable platform. In this respect, the height-adjustable platform may replace the entire arrangement of particulate material collecting device 30, porous structure 15' and pusher plate 28' in FIG. 14, and may at first be moved upward. If the platform is lowered, the particulate material can trickle off laterally. In addition, the particulate material may be blown off and/or be withdrawn by suction and/or brushed off/wiped off laterally.

According to yet another embodiment not shown, the auxiliary frame 20 may, for example, be moved laterally to an unpacking table, whereupon the auxiliary frame 20 is simply moved away upward, so that the fill 18 "falls apart" laterally, whereupon the components 16 may be removed.

According to yet another embodiment not shown, the auxiliary frame 20 may, for example, be moved sideways vertically above a slide which leads to a collecting tank, so that the fill 18 trickles/slides into the collecting tank along the slide, whereupon the components 16 may be removed from the collecting tank.

As can be seen from the above description, there are various possibilities to unpack the component received in the auxiliary frame at least in part from the particulate material fill and to remove it from the auxiliary frame (as can be seen from the above description, the "unpacking" and the "removing" process may take place simultaneously, may overlap or may take place separately from each other). In this respect, transferring the particulate material fill from the construction box into the auxiliary frame allows a quick release of the construction box; in addition, the component received in the auxiliary frame may at least in part be unpacked from the particulate material fill easily, reliably and quickly. In this respect, the construction box does not have to be modified.

The foregoing description of specific exemplary embodiments of the present invention has been presented for purposes of illustration and description. It is not intended to be exhaustive or to limit the invention to the precise forms disclosed, and obviously many modifications and variations are possible in light of the above teachings. The scope of the invention is to be defined by the Claims appended hereto and their equivalents.

The invention claimed is:

1. A method for unpacking a component (16) produced by means of a generative manufacturing method from a particulate material fill (18) of unconsolidated particulate material, said particulate material fill (18) is arranged in a receiving space together with the component, said receiving space is circumferentially limited by a vertical circumferential wall structure (12) of a construction box (10), which is open in an upward direction, in which a height-adjustable construction platform (14) is received on which the particulate material fill (18) containing the component (16) is arranged, the method being characterized in that:

an auxiliary frame (20) having a vertical circumferential wall structure (22) open in a downward direction and configured to receive the particulate material fill (18) containing the component (16) is arranged vertically above the vertical circumferential wall structure (12) of the construction box (10), the construction platform (14) is displaced upward, so that the particulate material fill (18) containing the component (16) is transferred from the construction box (10) to the auxiliary frame (20) and is received in the latter, the auxiliary frame (20) with the particulate material fill (18) containing the component (16) received therein, and the construction box (10) are moved away from each other, so that the latter is free for a following construction job, and the component (16) is unpacked at least in part from the particulate material fill (18) and is removed from the auxiliary frame (20);

wherein a plate-shaped structure (15) is arranged in the construction box (10) between the construction platform (14) and the particulate material fill (18) containing the component (16), and the plate-shaped structure is transferred from the construction box (10) to the auxiliary frame (20) together with the particulate material fill (18) arranged thereon and containing the component (16), and is relatively moved away from the construction box (10) together with the particulate material fill (18) and the auxiliary frame (20) into a position vertically above a particulate material collecting device (30).

2. A method for unpacking a component (16) produced by means of a generative manufacturing method from a particulate material fill (18) of unconsolidated particulate material, said particulate material fill (18) is arranged in a receiving space together with the component, said receiving space is circumferentially limited by a vertical circumferential wall structure (12) of a construction box (10), which is open in an upward direction, in which a height-adjustable construction platform (14) is received on which the particulate material fill (18) containing the component (16) is arranged, the method being characterized in that:

an auxiliary frame (20) having a vertical circumferential wall structure (22) open in a downward direction and configured to receive the particulate material fill (18) containing the component (16) is arranged vertically above the vertical circumferential wall structure (12) of the construction box (10), the construction platform (14) is displaced upward, so that the particulate material fill (18) containing the component (16) is transferred from the construction box (10) to the auxiliary frame (20) and is received in the latter, the auxiliary frame (20) with the particulate material fill (18) containing the component (16) received therein, and the construction box (10) are moved away from each other, so that the latter is free for a following construction job, and the component (16) is unpacked at least in part from the particulate material fill (18) and is removed from the auxiliary frame (20);

wherein the auxiliary frame (20) with the particulate material fill (18) received therein and containing the component (16), and the construction box (10) are relatively moved away from each other laterally and wherein the auxiliary frame (20) with the particulate material fill (18) received therein and containing the component (16) is arranged vertically above a plate-shaped structure (15') and wherein through-holes of the porous, plate-shaped structure (15') are filled with particulate material and/or covered during a lateral relative movement between the auxiliary frame (20) and the porous, plate-shaped structure (15'), to reduce a discharge of particulate material from the auxiliary frame (20).

3. A method for unpacking a component (16) produced by means of a generative manufacturing method from a particulate material fill (18) of unconsolidated particulate material, said particulate material fill (18) is arranged in a receiving space together with the component, said receiving space is circumferentially limited by a vertical circumferential wall structure (12) of a construction box (10), which is open in an upward direction, in which a height-adjustable construction platform (14) is received on which the particulate material fill containing (18) the component (16) is arranged, the method being characterized in that:

an auxiliary frame (20) having a vertical circumferential wall structure (22) open in a downward direction and configured to receive the particulate material fill (18) containing the component (16) is arranged vertically above the vertical circumferential wall structure (12) of the construction box (10), the construction platform (14) is displaced upward, so that the particulate material fill (18) containing the component (16) is transferred from the construction box (10) to the auxiliary frame (20) and is received in the latter, the auxiliary frame (20) with the particulate material fill (18) containing the component (16) received therein, and the construction box (10) are moved away from each other, so that the latter is free for a following construction job, and the component (16) is unpacked at least in part from the particulate material fill (18) and is removed from the auxiliary frame (20);

wherein the particulate material fill (18) containing the component (16) is arranged on a porous, plate-shaped structure (15, 15') during the at least partial unpacking of the component from the particulate material fill and wherein the at least partially unpacked component (16) is moved to a component transfer station (40) together with the porous, plate-shaped structure (15, 15') and the auxiliary frame (20), where the component and the porous, plate-shaped structure are separated from the auxiliary frame, and from where the component is fed to a component stock (50).

* * * * *